United States Patent
Hull

(10) Patent No.: US 10,034,551 B2
(45) Date of Patent: Jul. 31, 2018

(54) FOLDABLE BEDDING FOUNDATION HAVING L-SHAPED SPACERS

(71) Applicant: L&P Property Management Company, South Gate, CA (US)

(72) Inventor: John E. Hull, Monett, MO (US)

(73) Assignee: L&P Property Management Company, South Gate, CA (US)

( * ) Notice: Subject to any disclaimer, the term of this patent is extended or adjusted under 35 U.S.C. 154(b) by 437 days.

(21) Appl. No.: 15/009,247

(22) Filed: Jan. 28, 2016

(65) Prior Publication Data

US 2016/0143447 A1     May 26, 2016

Related U.S. Application Data

(60) Continuation-in-part of application No. 14/818,636, filed on Aug. 5, 2015, now Pat. No. 9,814,322, which is a division of application No. 14/492,182, filed on Sep. 22, 2014, now Pat. No. 9,226,590.

(51) Int. Cl.
| | |
|---|---|
| *A47C 19/02* | (2006.01) |
| *A47C 23/00* | (2006.01) |
| *F16B 12/56* | (2006.01) |
| *A47C 19/12* | (2006.01) |

(52) U.S. Cl.
CPC ............ *A47C 19/025* (2013.01); *A47C 19/12* (2013.01); *A47C 23/005* (2013.01); *F16B 12/56* (2013.01)

(58) Field of Classification Search
CPC ................................ A47C 19/02; A47C 19/12
USPC .............................. 5/282.1, 174, 176.1, 201
See application file for complete search history.

(56) References Cited

U.S. PATENT DOCUMENTS

| | | |
|---|---|---|
| 3,077,612 A | 2/1963 | Sevcik |
| 3,863,278 A | 2/1975 | Herrera |
| 4,251,892 A | 2/1981 | Lancock |
| 4,377,279 A | 3/1983 | Schulz, Jr. et al. |
| 4,489,450 A | 12/1984 | Miller |
| 4,620,336 A | 11/1986 | Miller |
| 4,654,905 A | 4/1987 | Miller |
| 4,704,752 A | 11/1987 | Yates et al. |
| 4,770,397 A | 9/1988 | Schulz, Jr. |
| 4,771,995 A | 9/1988 | Wells et al. |
| 4,903,949 A | 2/1990 | Schulz, Jr. |
| 5,165,125 A | 11/1992 | Callaway |
| 5,167,393 A | 12/1992 | Hayakawa et al. |
| 5,346,188 A | 9/1994 | Rodgers et al. |
| 5,502,930 A | 4/1996 | Burkette et al. |
| 5,551,104 A | 9/1996 | Hartline |
| 5,577,280 A | 11/1996 | Elliott |
| 5,622,357 A | 4/1997 | Schulz, Jr. et al. |

(Continued)

FOREIGN PATENT DOCUMENTS

WO     2012024477     2/2012

*Primary Examiner* — Fredrick C Conley
(74) *Attorney, Agent, or Firm* — Wood, Herron & Evans, LLP

(57) ABSTRACT

A foldable bedding foundation comprising a first section is hingedly secured to a second section so that the bedding foundation may be folded for storage or transportation purposes. Each section has a base, an upper deck and a plurality of generally L-shaped spacers pivotally secured to the base and upper deck. Upper and lower hinges extend between the base and upper deck of each section. Locking members extending through the spacers maintain the foundation in its erected position.

20 Claims, 42 Drawing Sheets

(56) References Cited

U.S. PATENT DOCUMENTS

| | | | |
|---|---|---|---|
| 5,720,471 | A | 2/1998 | Constantinescu et al. |
| 5,765,240 | A | 6/1998 | Workman |
| 5,950,260 | A | 9/1999 | Dees |
| 6,012,190 | A | 1/2000 | Rogers |
| 6,032,307 | A | 3/2000 | Workman |
| 6,581,223 | B1 | 6/2003 | Wang |
| 6,651,276 | B2 | 11/2003 | McCraw et al. |
| 6,729,610 | B2 | 5/2004 | Constantinescu |
| 7,376,988 | B2 | 5/2008 | Wickstrom et al. |
| 7,503,086 | B2 | 3/2009 | Wickstrom et al. |
| 8,312,576 | B1 | 11/2012 | Oh |
| 8,328,284 | B2 | 12/2012 | Loomis |
| 8,370,973 | B1 | 2/2013 | Oh |
| 8,769,740 | B2 | 7/2014 | Oh |
| 9,226,590 | B1 | 1/2016 | Hull et al. |
| 9,266,590 | B1 * | 2/2016 | Dye .................. B63C 1/02 |
| 9,456,699 | B1 * | 10/2016 | Oh .................. A47C 19/122 |
| 9,538,850 | B2 * | 1/2017 | Oh .................. A47C 19/02 |
| 2008/0000024 | A1 | 1/2008 | Peixin et al. |
| 2008/0222801 | A1 | 9/2008 | Harrow |
| 2009/0293193 | A1 | 12/2009 | Neatherry et al. |
| 2012/0042449 | A1 | 2/2012 | Hull et al. |
| 2012/0222216 | A1 | 9/2012 | Jin |
| 2013/0067659 | A1 | 3/2013 | Oh |

\* cited by examiner

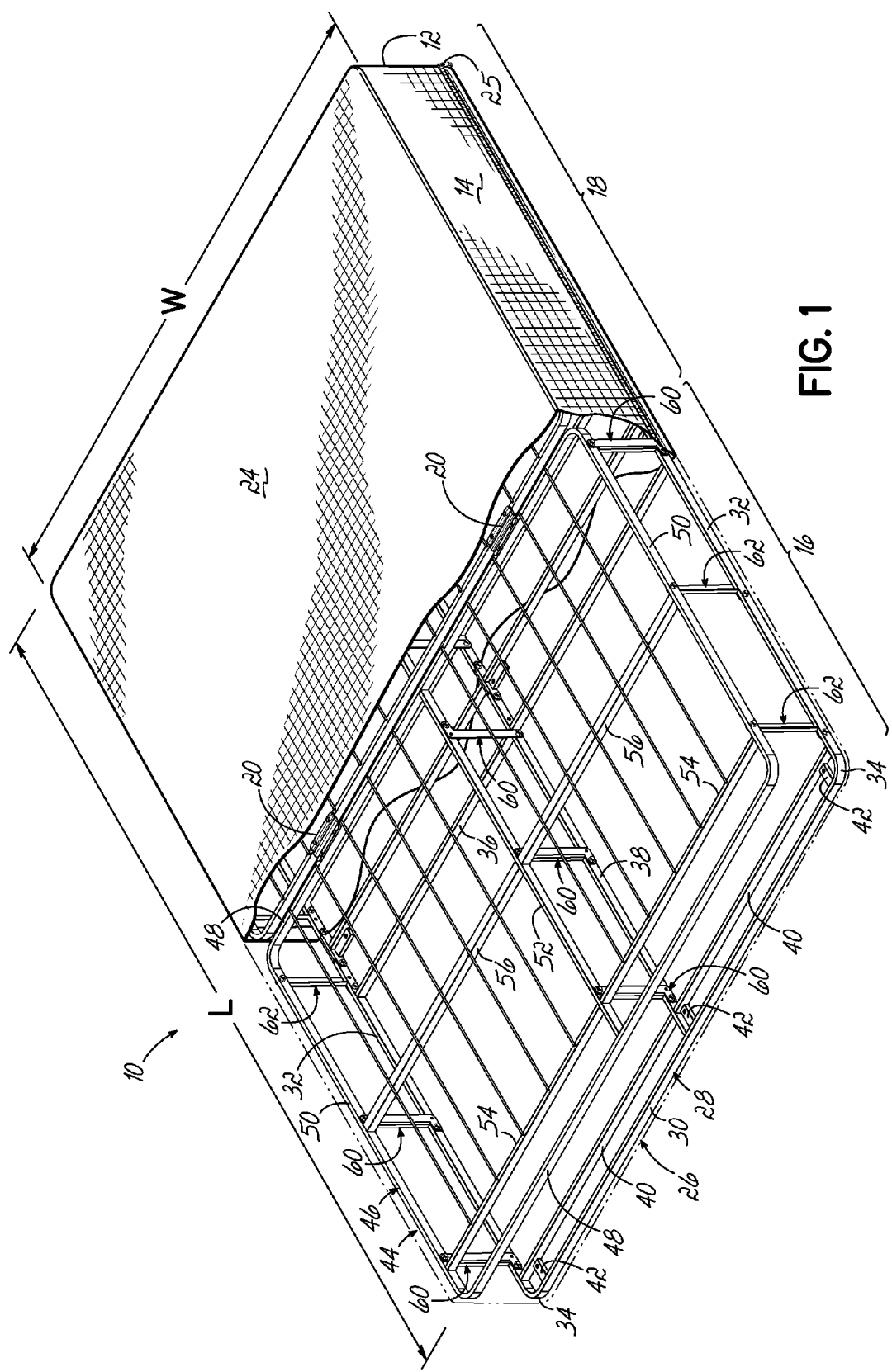

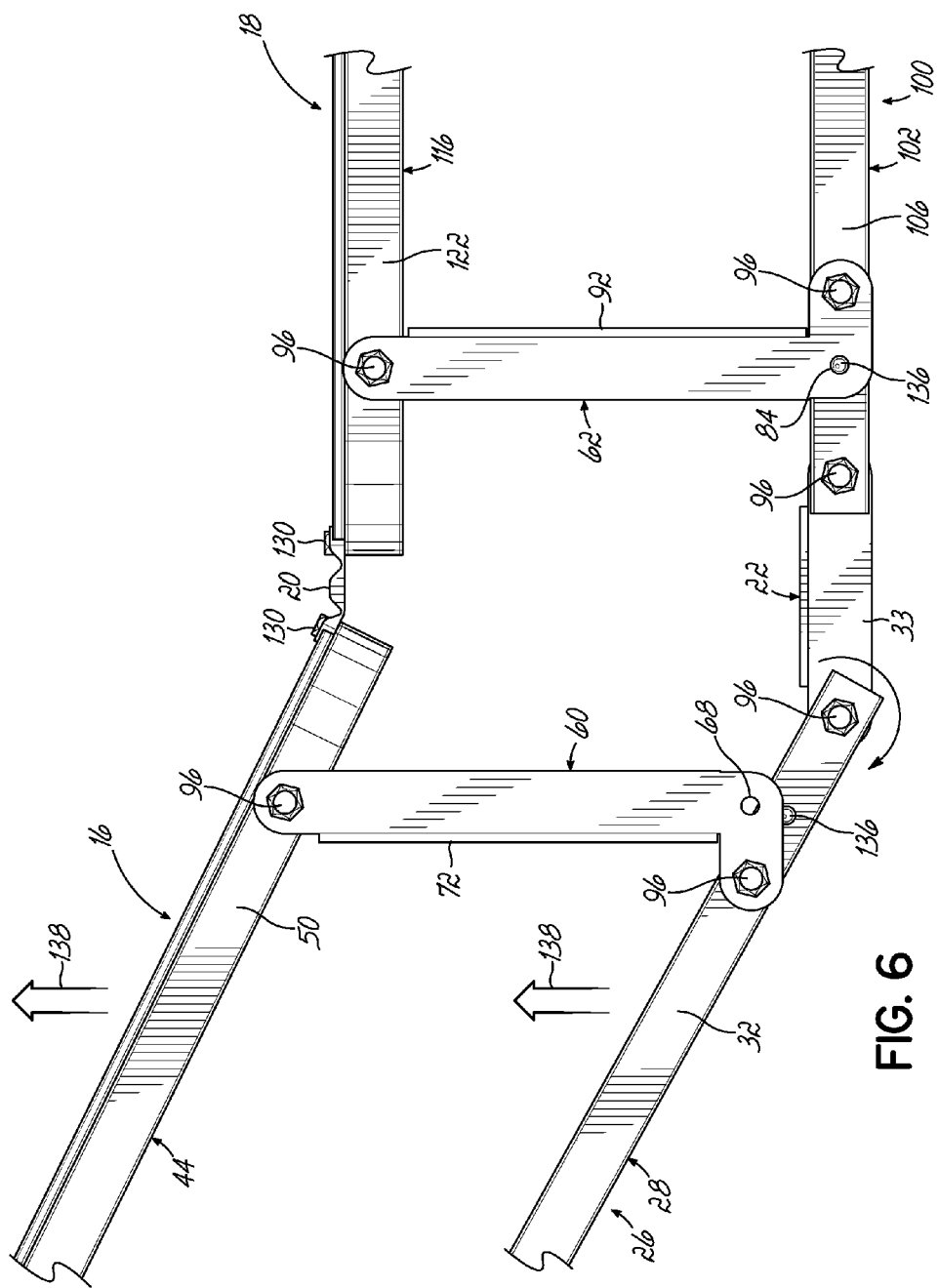

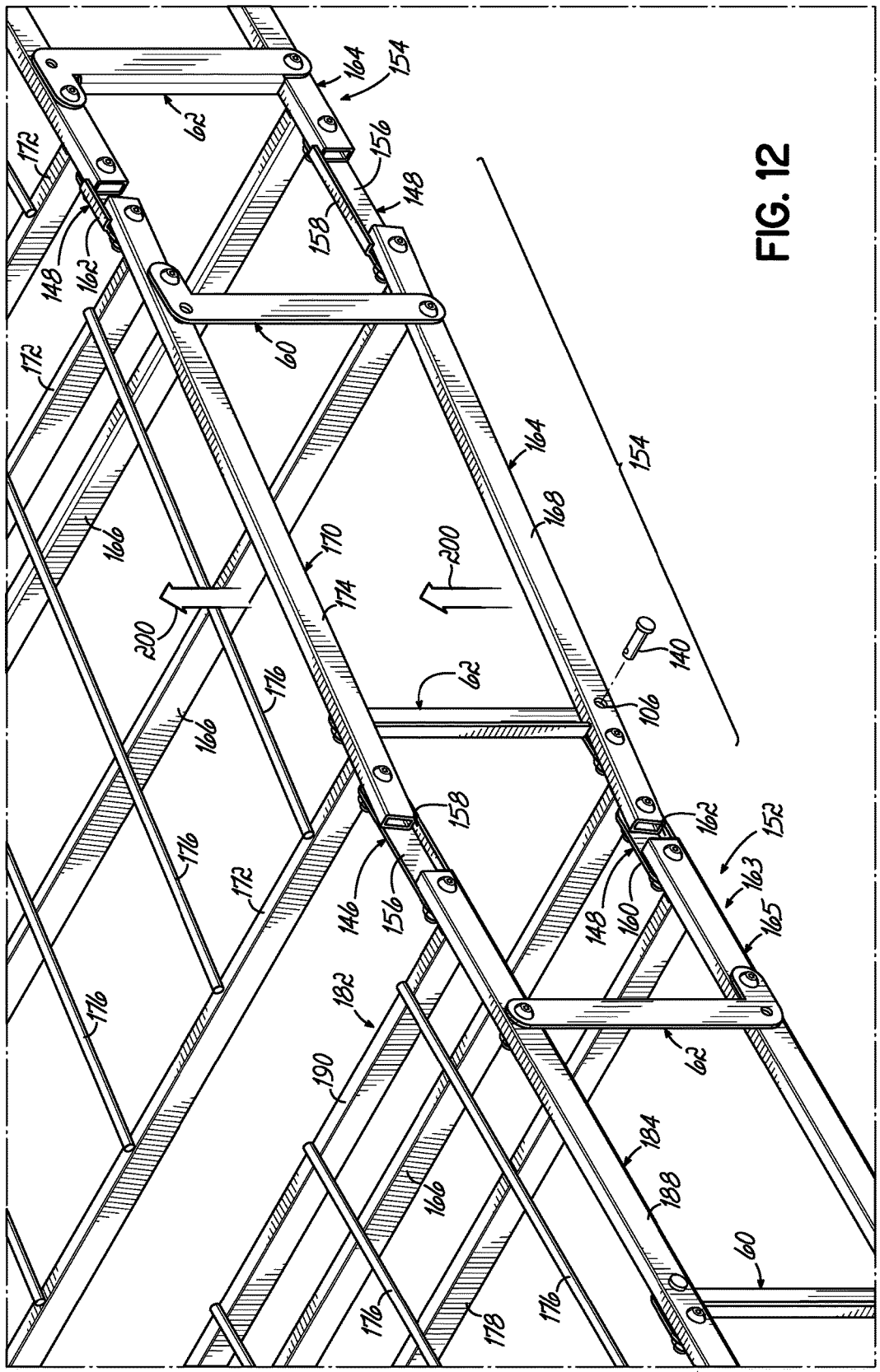

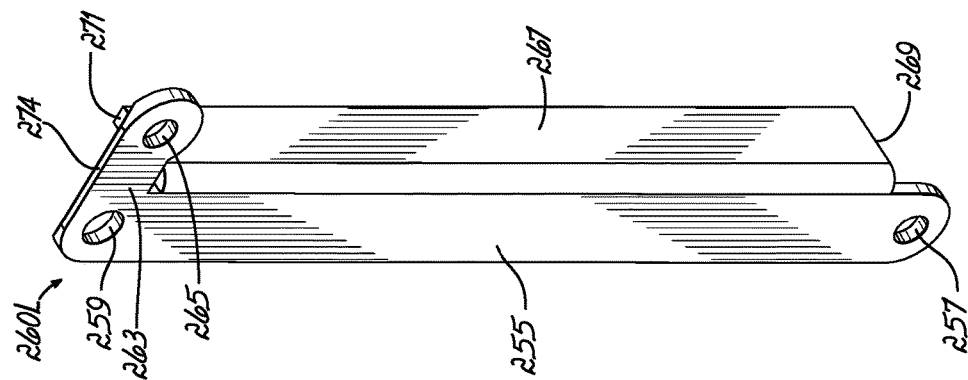
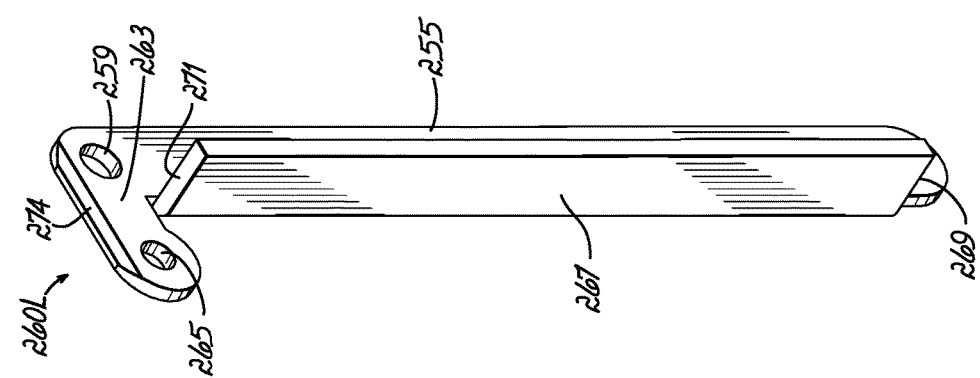
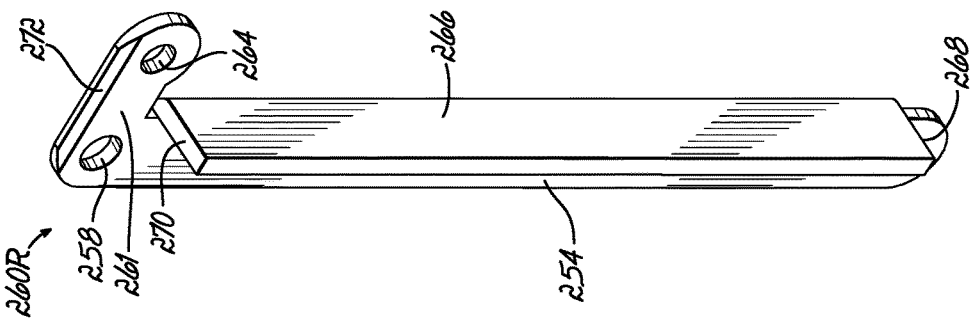
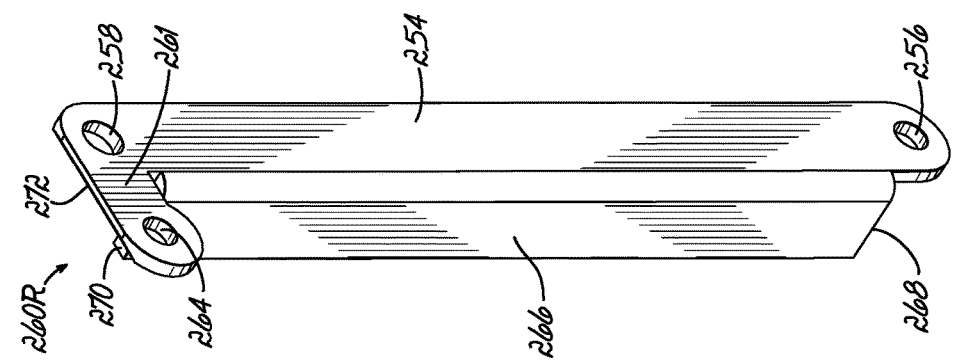

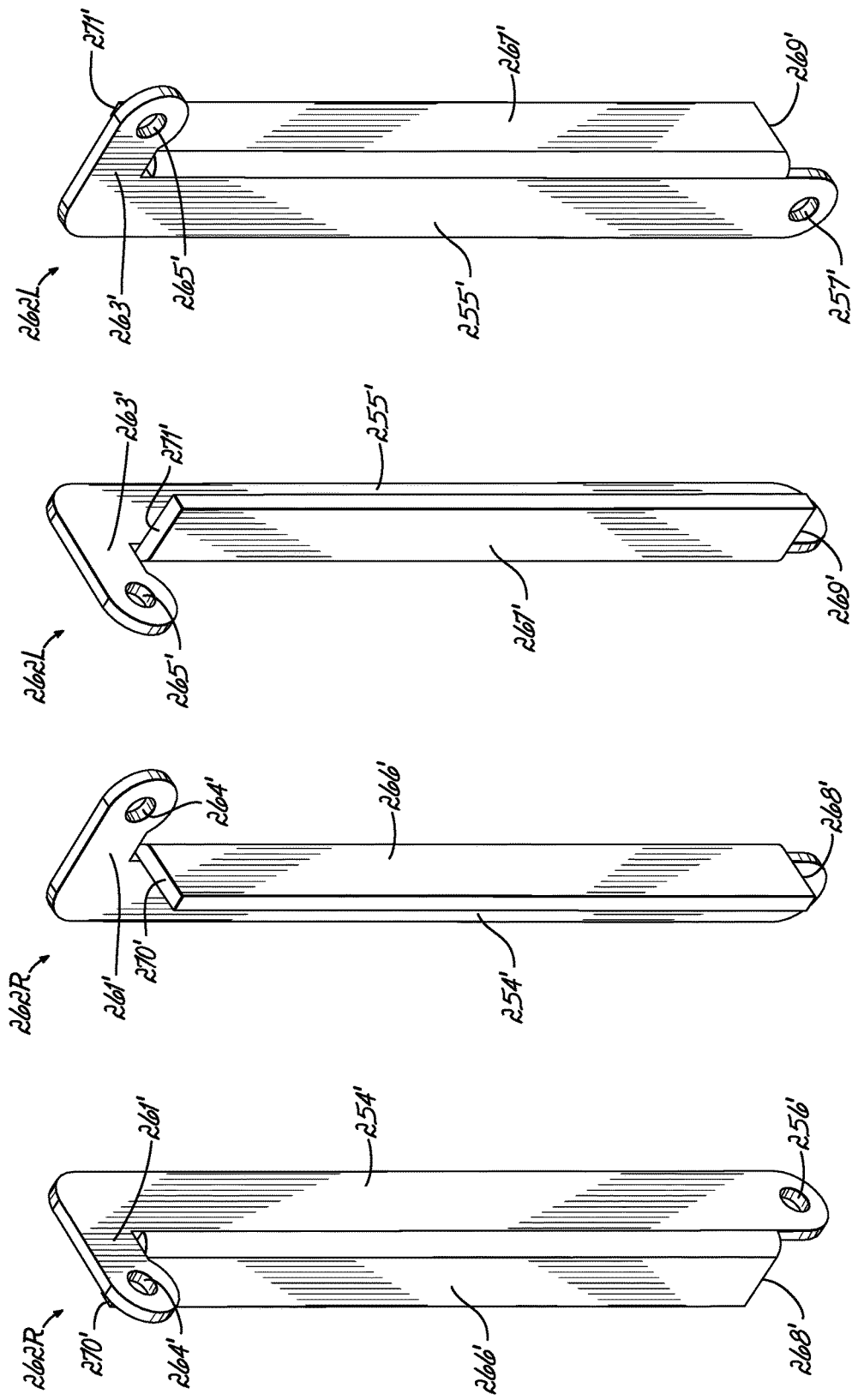

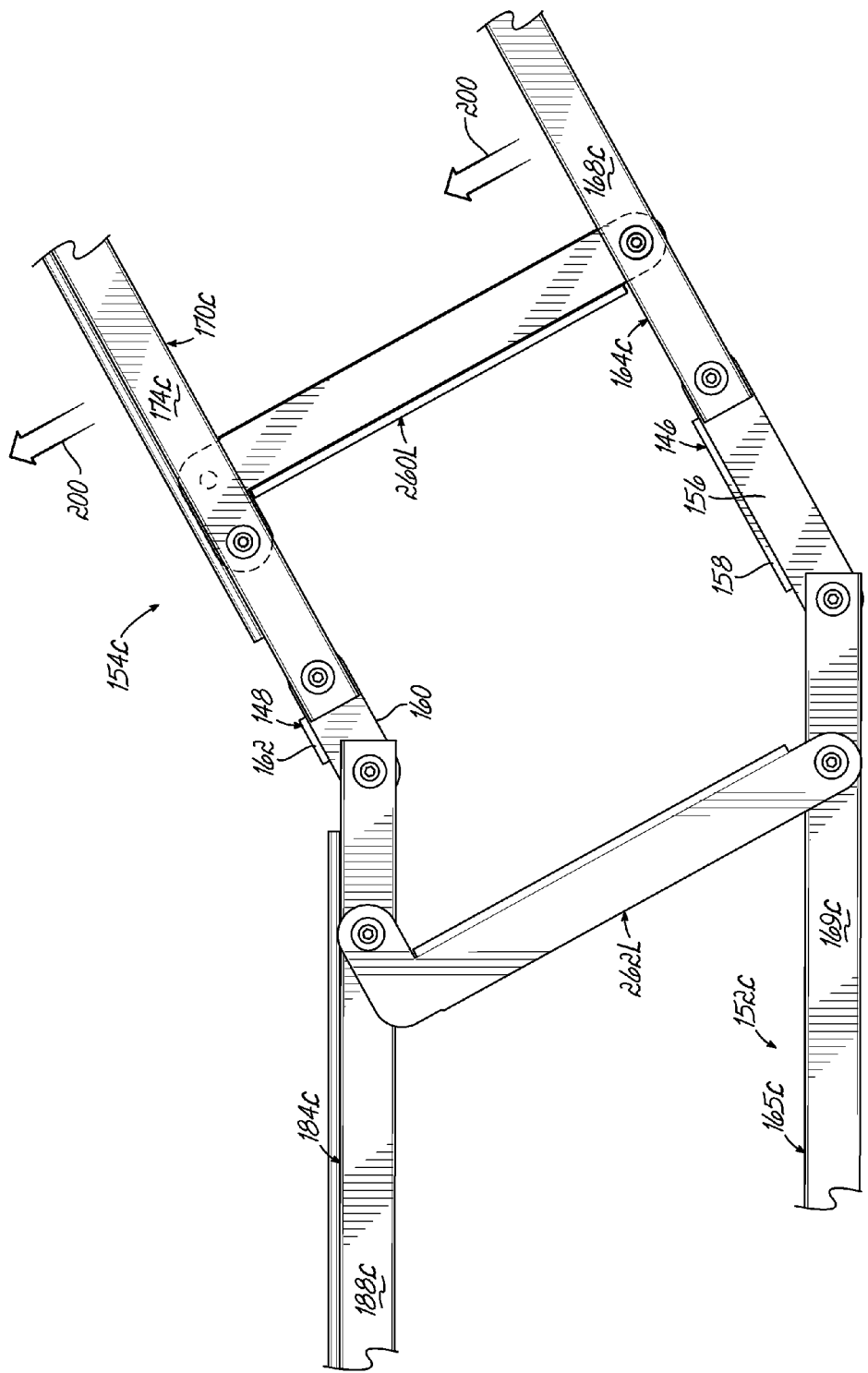

FOLDABLE BEDDING FOUNDATION HAVING L-SHAPED SPACERS

CROSS REFERENCE TO RELATED APPLICATIONS

This application is a continuation-in-part of U.S. patent application Ser. No. 14/818,636 filed Aug. 5, 2015, which is a divisional of U.S. patent application Ser. No. 14/492,182 filed Sep. 22, 2014, now U.S. Pat. No. 9,226,590. Both applications are fully incorporated by reference herein.

FIELD OF THE INVENTION

This invention relates generally to bedding foundations and, more particularly, to a bedding foundation which is collapsible for storage and shipment.

BACKGROUND OF THE INVENTION

Conventional bedding foundations, such as box springs, typically include an array or matrix of springs, a wooden base and an upper deck, including a generally rectangular border wire. The springs may be coil springs or modular springs. The components are commonly shipped from a spring manufacturer to a box spring manufacturer separately. Once the components arrive at the box spring manufacturer's facility, the box spring manufacturer attaches the lower ends of the springs, which extend downwardly from an upper deck assembly to a base. Padding and a cover is applied by the box spring manufacturer as desired. Such conventional bedding foundations are large and cumbersome to handle in storage, transportation or shipment which, of course, increases the ultimate cost.

Moreover, it is not uncommon for a coil spring manufacturer to compress or deform coil spring units layered one on top of the other into condensed or compacted multilayered packs for shipment to a box spring manufacturer. The aforementioned step is performed by means of a press machine, enabling the foundation units to be compressed to reduce their height dimension. The coil spring units of each pack are held in their compacted state against return to their normal or unstressed condition by means of strapping applied about the unit. The spring units of each pack being compressed, the strapping is applied a great amount of tension. When the packs arrive at the place of the manufacturer, it is, of course, necessary to sever the strapping around the packs in order to release the spring units for installation into box springs or mattresses. This, of course, is difficult because of the high degree of tension to which the strapping is subjected by the compression of the coil springs.

U.S. Pat. No. 4,377,279 discloses a wire foundation unit for a box spring which may be shipped to a box spring manufacturer in a collapsed condition. The manufacturer would erect the foundation wires and then fix by staples, rigid struts between the wire unit and base to permanently secure the wire unit in the erected position. The box spring manufacturing process is completed by providing the conventional layer of padding on the top of the wire foundation and a sheet covering or casing about the entire unit. However, once the manufacture is completed, the box spring is no longer collapsible and thus, must be shipped in its expanded or full-size state to the point of retail or use, whereby the same storage and shipment costs result at this point as with conventional box springs.

U.S. Pat. No. 4,654,905 discloses another collapsible bedding foundation for a box spring which can be shipped to a box spring manufacturer in a collapsed condition. The box spring manufacturer would erect the collapsed bedding foundation before applying padding on the top of the erected bedding foundation and covering or casing the entire unit. The collapsible bedding foundation disclosed in this patent utilizes a hinge to connect two sections of the bedding foundation so that when collapsed, one section may overlay the other section. One drawback to this bedding foundation is that the hinge is expensive, thereby adding substantial cost to the manufacturer of the collapsible bedding foundation, which is, in turn, passed on to the manufacturer of the box spring.

Therefore, there is a need for a collapsible box spring which is less expensive to manufacture than known collapsible box springs. There is further a need for an affordable box spring which may be collapsed after being upholstered.

SUMMARY OF THE INVENTION

One embodiment of bedding foundation of the present invention comprises three sections which are hingedly secured together with upper and lower hinges. The foundation is movable between a retracted or collapsed position and an extended or erected position. In one embodiment, the foundation is maintained in its erected position by a plurality of locking members. Each locking member is located in either a base or deck of one of the three sections made of hollow tubing having a rectangular cross-section.

In one embodiment, each of the sections comprises a base, an upper deck and a plurality of generally L-shaped spacers pivotally secured to the base and upper deck, such that the section may be collapsed. The base of each section comprises a hollow perimeter base member and a longitudinally extending hollow middle base member. The perimeter and middle base members may be made of one or more pieces of metal. The perimeter and middle base members are each made of material known in the industry as rectangular tubing, which has a hollow interior and a generally rectangular cross-sectional configuration. Additional base members may be included.

The upper deck of each section comprises a perimeter deck member and a longitudinally extending middle member. The perimeter deck member has two sides and two ends. The middle deck member extends between the ends of the perimeter deck member. The perimeter deck member and middle deck member each may be made of one or more pieces of metal. The perimeter deck member and middle deck member each may be made of rectangular tubing in order to reduce the weight of the product.

In one embodiment, each section of the foldable foundation comprises two types of generally L-shaped spacers, right-hand and left-hand generally L-shaped spacers. Each of the generally L-shaped spacers is pivotally connected to the base and upper deck of one section. Locking members may be inserted through openings in some of the generally L-shaped spacers to maintain the foundation in an erect position. In one embodiment, the locking members are spring clips located in the hollow interiors of the base members. In another embodiment, the locking members are removable locking pins.

When the spring clips are compressed, or the locking pins removed and the foundation folded, the foundation is substantially reduced in its depth dimension, thereby facilitating storage handling and/or shipment at reduced unit cost. When portions of the locking members extend through openings in at least some of the generally L-shaped spacers, the foundation is secured in an erected position and the foundation is ready for use. After use, the bedding foundation may be collapsed to its storage position and then later expanded to its use or erected position. This process may be repeated as often as desired.

BRIEF DESCRIPTION OF THE DRAWINGS

FIG. 6 is a side elevational view of a portion of the bedding foundation of FIG. 1A being collapsed.

FIG. 10 is an enlarged perspective view of a portion of the collapsible bedding foundation of FIG. 9A.

FIG. 12 is an enlarged perspective view of a portion of the collapsible bedding foundation of FIG. 9A showing one of the locking pins being removed.

FIG. 17A is a front perspective view of one of the left-hand locking spacers.

FIG. 17B is a rear perspective view of the left-hand spacer of FIG. 17A.

FIG. 18A is a front perspective view of one of the right-hand spacers.

FIG. 18B is a rear perspective view of the right-hand spacer of FIG. 18A.

FIG. 19A is a front perspective view of one of the left-hand regular spacers.

FIG. 19B is a rear perspective view of the left-hand regular spacer of FIG. 17A.

FIG. 20A is a front perspective view of one of the right-hand regular spacers.

FIG. 20B is a rear perspective view of the right-hand regular spacer of FIG. 20A.

FIG. 28 is a side elevational view of a portion of the bedding foundation of FIG. 9A being collapsed.

DETAILED DESCRIPTION OF THE DRAWINGS

Figure 1A:
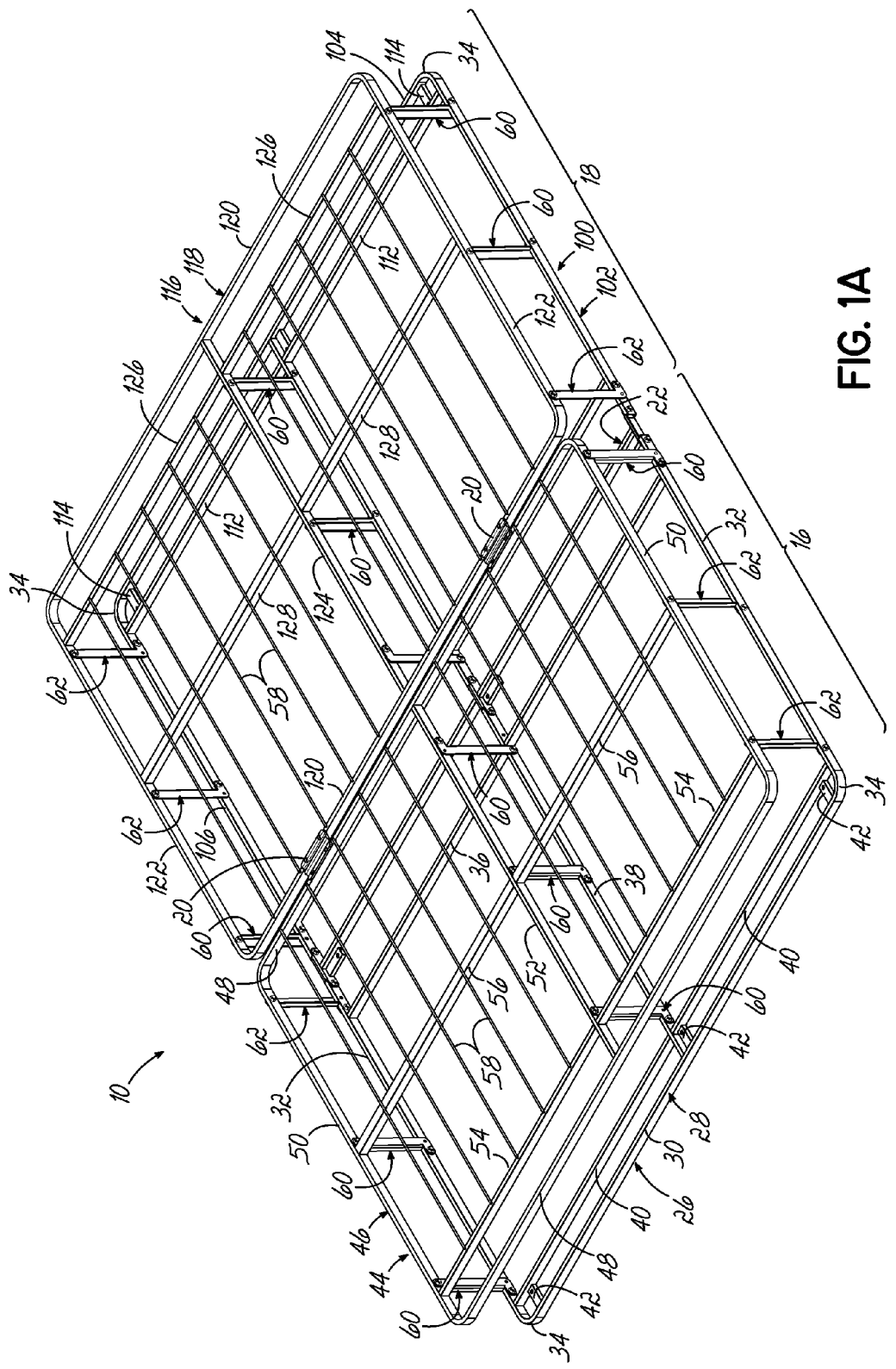
FIG. 1A is a perspective view of the collapsible bedding foundation of FIG. 1 without any covering.
Figure 1B:
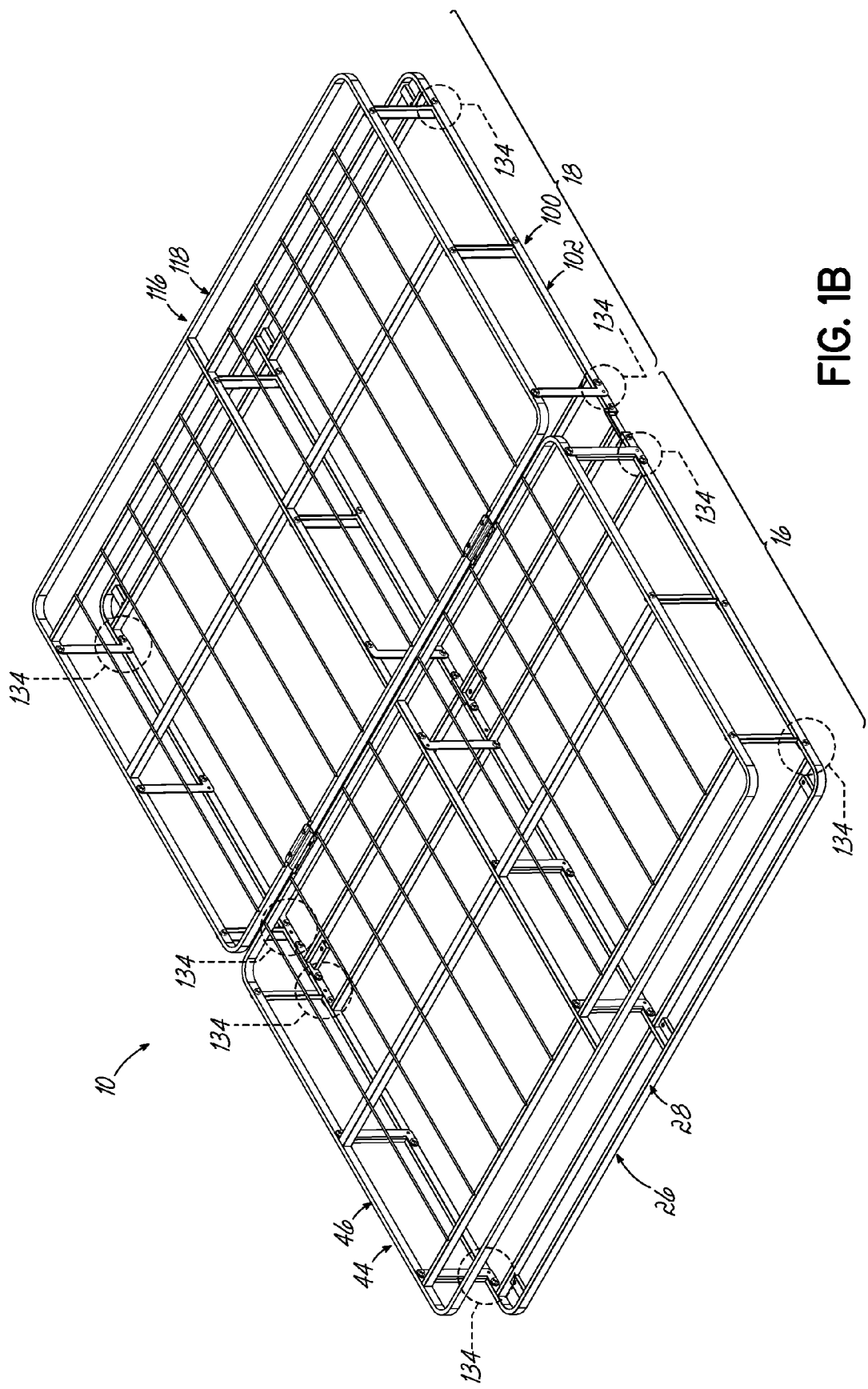
FIG. 1B is a perspective view of the collapsible bedding foundation of FIG. 1A showing the locations of the locking mechanisms.

Referring to the drawings, and particularly to FIG. 1, there is illustrated a foldable or collapsible bedding foundation 10. The bedding foundation 10 has a pair of end surfaces 12 defining a length or longitudinal dimension L of the foundation 10 and a pair of opposed side surfaces 14 defining a width W of the foundation 10. The bedding foundation 10 has a first section 16 hinged to a second section 18 with two upper hinges 20 and a lower hinge assembly 22. See FIG. 2. The upper hinges 20 and lower hinge assembly 22 enable the bedding foundation 10 to move from an erected position shown in FIGS. 1 and 1A to a fully collapsed position shown in FIG. 8. Although the drawings illustrate the bedding foundation 10 with no cover, the bedding foundation 10 may be collapsed with a surrounding cover 24 as partially shown in FIG. 1. If desired, padding (not shown) may be placed on at least one surface of the bedding product 10 before the surrounding cover 24 is attached. The cover 24 is illustrated having a zipper 25 therein. However, any removable cover, including the cover 24a illustrated in FIG. 9 and described below, may be used.

Figure 2:
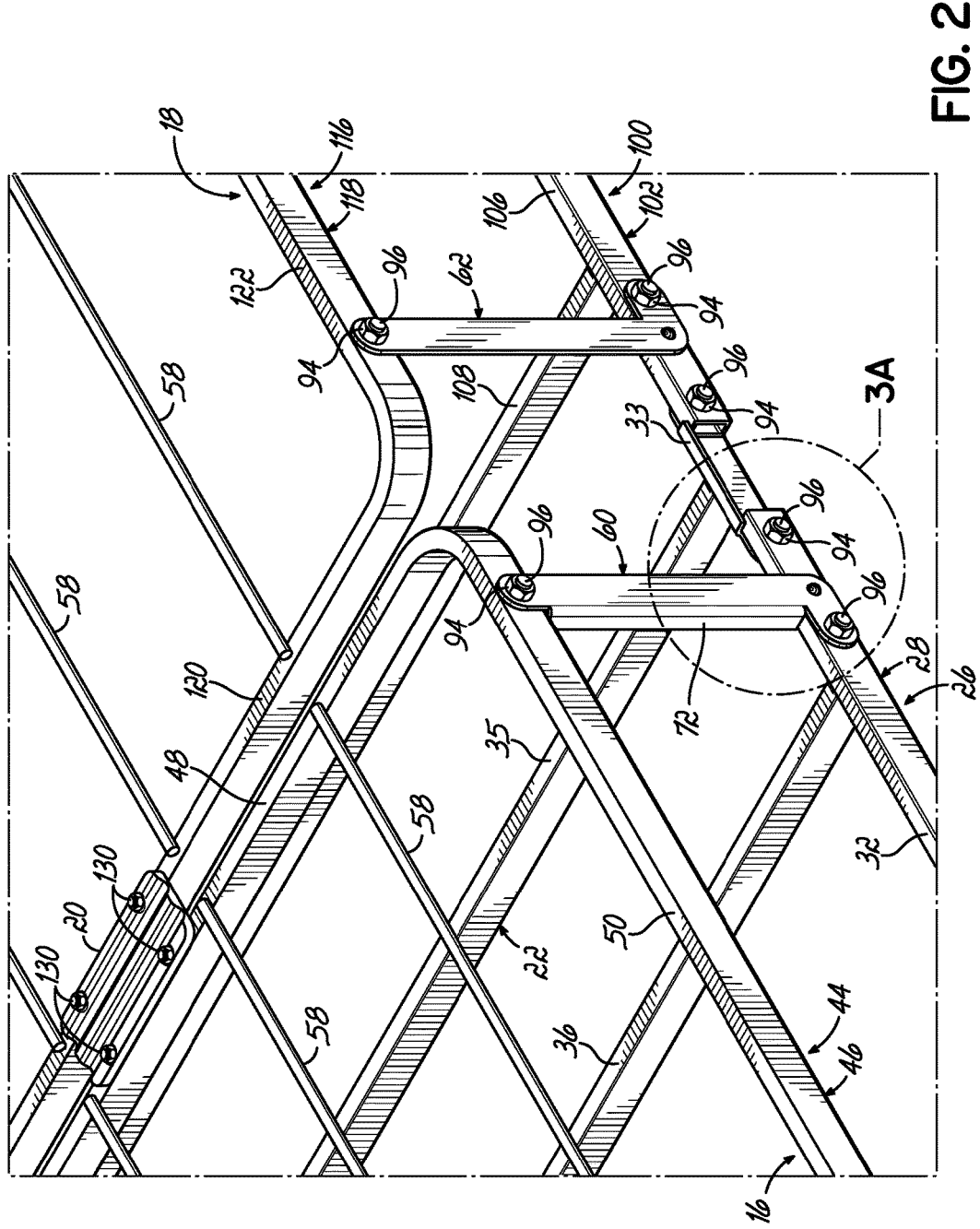
FIG. 2 is an enlarged perspective view of a portion of the collapsible bedding foundation of FIG. 1.

Referring to FIGS. 1A and 2, the first section 16 comprises a first base 26 comprising a generally U-shaped member 28 made of rectangular tubing as defined hereinabove. The hollow generally U-shaped perimeter member 28 comprises an end member 30 and a pair of opposed parallel sides 32 joined together with corner members 34. Although the generally U-shaped perimeter member 28 is shown comprising multiple members joined together, the generally U-shaped perimeter member 28 may be made of a single piece of rectangular tubing. The base 26 further comprises two transversely extending cross members 36 made of rectangular tubing. Each cross member 36 extends between and is secured to one of the sides 32 of the generally U-shaped perimeter base member 28 and a middle base member 38. The base 26 further comprises a longitudinally extending middle base member 38 secured to and extending between the lower hinge assembly 22 and the end member 30 of the generally U-shaped perimeter base member 28. The middle base member 38 is made of rectangular tubing. The base 26 further comprises two stability members 40, each stability member 40 extending between the middle member 38 and one of the sides 32 of the generally U-shaped perimeter base member 28, and being spaced from the end member 30 of the generally U-shaped perimeter base member 28 with at least one stabilizer 42.

As shown in FIGS. 1 and 1A, the first section 16 of the collapsible bedding foundation 10 further comprises a first upper deck 44 comprising a first perimeter deck member 46 made of rectangular tubing. The first perimeter deck member 46 has two ends 48 and two sides 50. Although the generally rectangular perimeter deck member 46 is shown comprising multiple members joined together, the generally rectangular perimeter deck member 46 may be made of any number of pieces, including a single piece of rectangular tubing.

The first upper deck 44 further comprises a longitudinally extending middle member 52 secured to and extending between the ends 48 of the first perimeter deck member 46. The middle member 52 is made of rectangular tubing. The first upper deck 44 further comprises two end cross members 54, and two middle cross members 56, each being made of rectangular tubing. Each cross member 54, 56 extends between the middle member 52 and one of the sides 50 of the first perimeter deck member 46. As best shown in FIG. 2, the first upper deck 44 further comprises a plurality of spaced, parallel longitudinally extending deck wires 58 secured to one end 48 of the first perimeter deck member 46 (closest the hinges) and one of the end cross members 54 by welding. The longitudinally extending deck wires 58 are further secured to the middle cross members 56 at their intersections.

Figure 5B:
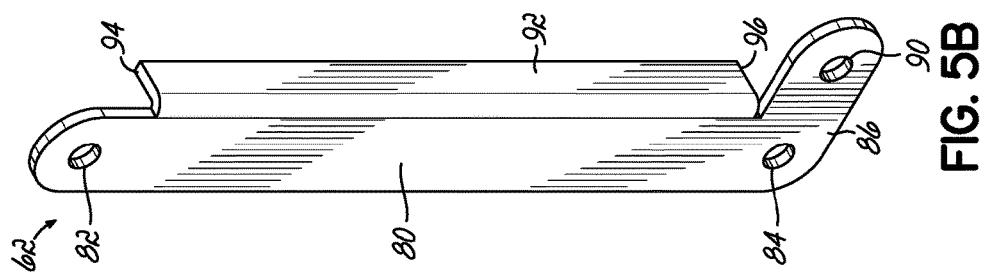
FIG. 5B is a perspective view of one of the right-hand spacers.
Figure 5A:
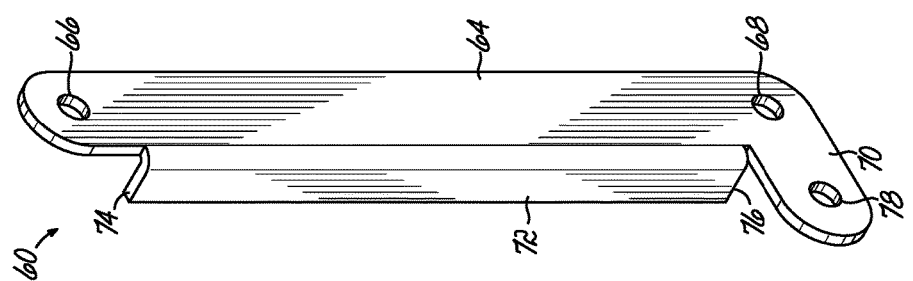
FIG. 5A is a perspective view of one of the left-hand spacers.

As best seen in FIGS. 5A and 5B, each of the first and second sections 16, 18 of the collapsible bedding foundation 10 further comprises multiple L-shaped spacers 60, 62. Each L-shaped spacer 60, 62 is pivotally connected to the first base 26 and the first upper deck 44.

FIG. 5A illustrates a left-hand spacer 60. Each left-hand spacer 60 is made of one piece of metal and comprises a generally planar body portion 64 having an opening 66 in the form of a hole at the top thereof and an opening 68 in the form of a hole at the bottom thereof. The left-hand spacer 60 further comprises a leg 70 at the bottom thereof integral with the body portion 64, the leg 70 being co-planar with the body portion 64. The leg 70 has an opening 78 in the form of a hole therein. The left-hand spacer 60 further comprises a flange 72 integral with the body portion 64. The flange 72 has an upper edge 74 and a lower edge 76. As shown in FIG. 5A, leg 70 extends generally perpendicular to the body portion 64, but in the same plane. Flange 72 extends generally perpendicular to the plane of the body portion 64 and leg 70.

FIG. 5B illustrates a right-hand spacer 62. Each right-hand spacer 62 is made of one piece of metal and comprises a generally planar body portion 80 having an opening 82 in the form of a hole at the top thereof and an opening 84 in the form of a hole at the bottom thereof. The right-hand spacer 62 further comprises a leg 86 at the bottom thereof integral with the body portion 80, the leg 86 being co-planar with the body portion 80. The leg 86 has an opening 90 in the form of a hole therein. The right-hand spacer 62 further comprises a flange 92 integral with the body portion 80. The flange 92 has an upper edge 94 and a lower edge 96. As shown in FIG. 5B, leg 86 extends generally perpendicular to the body portion 80, but in the same plane. Flange 92 extends generally perpendicular to the plane of the body portion 80 and leg 86.

As best seen in FIG. 1A, a column of spacers, two left-hand spacers 60 and one right-hand spacer 62, are pivotally connected to the far side 32 of the generally U-shaped perimeter member 28 of first base 26 and the far side 50 of the perimeter member 46 of the first deck 44. Additionally, another column of spacers, two right-hand spacers 62 and one left-hand spacer 60, are pivotally connected to the near side 32 of the generally U-shaped perimeter member 28 of first base 26 and the near side 50 of the perimeter member 46 of the first deck 44. Lastly, a third column of spacers, three left-hand spacers 60, are pivotally connected to the middle member 38 of the first base 26 and the middle member 52 of the first deck 44.

Figure 3A:
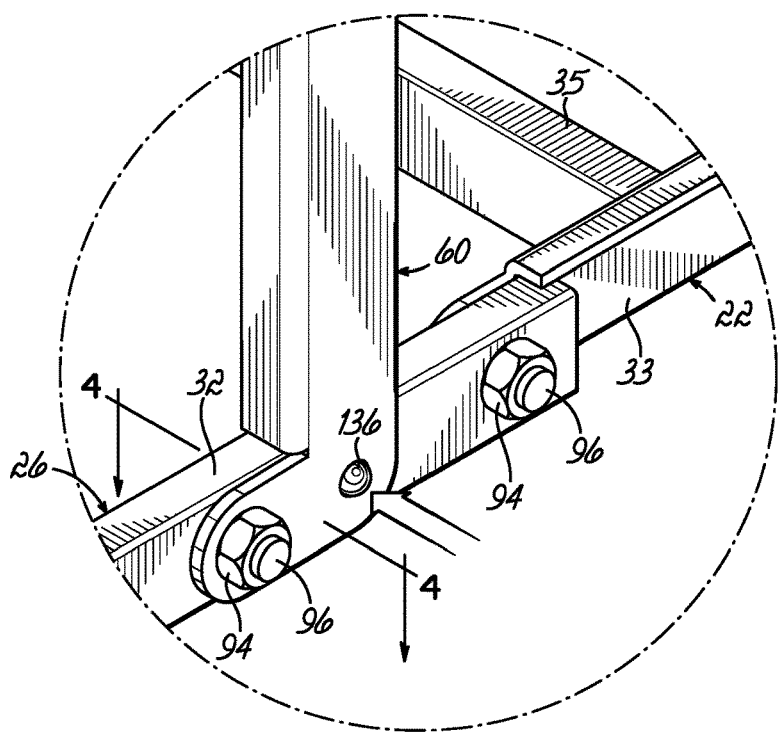
FIG. 3A is an enlarged perspective view of the encircled area 3A of FIG. 2.
Figure 3B:
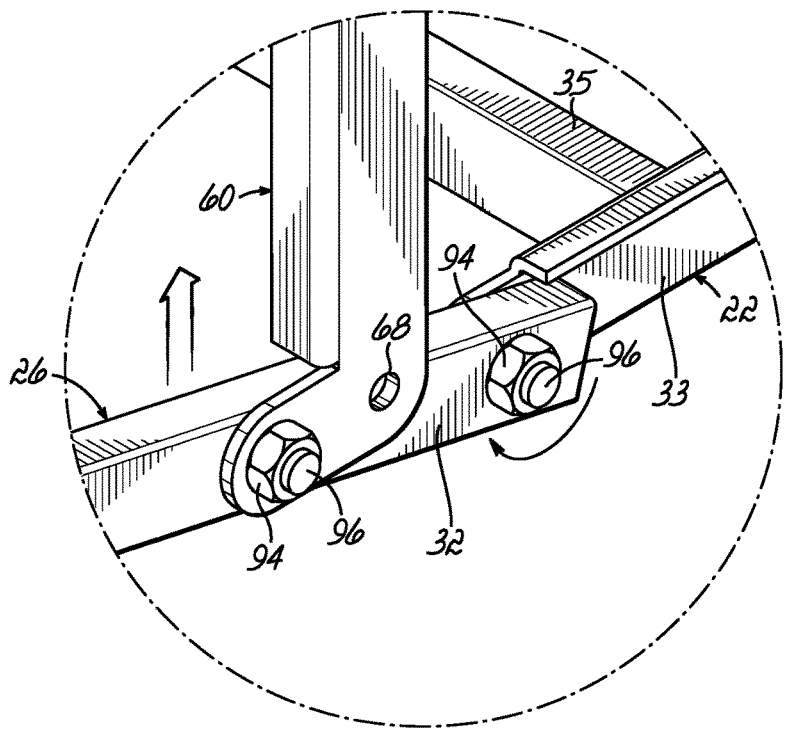
FIG. 3B is an enlarged perspective view like FIG. 3A illustrating one of the spring clips being compressed and the foundation collapsed.
Figure 4:
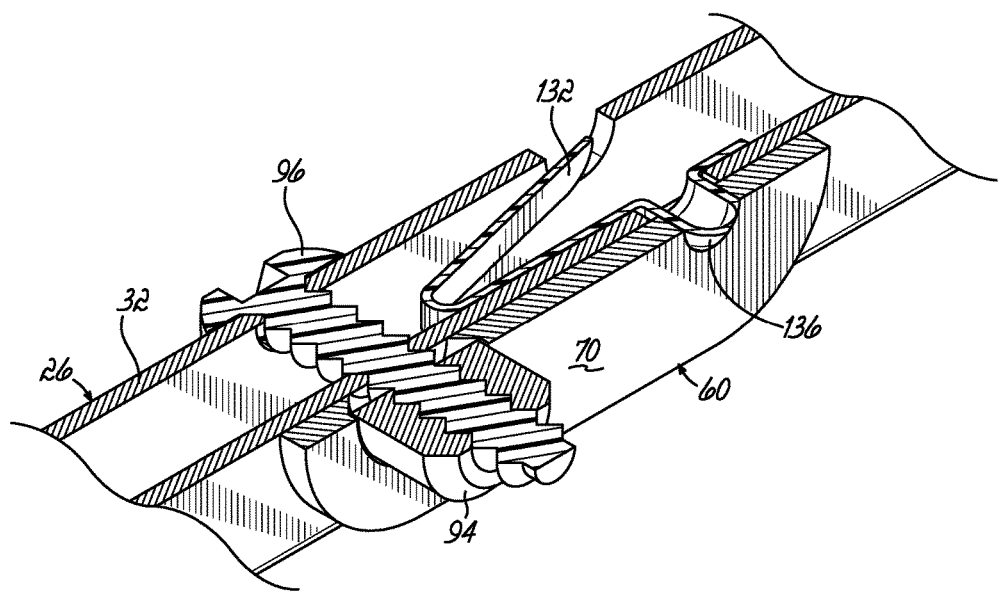
FIG. 4 is a cross-sectional view taken along the line 4-4 of FIG. 3A.
Figure 4A:
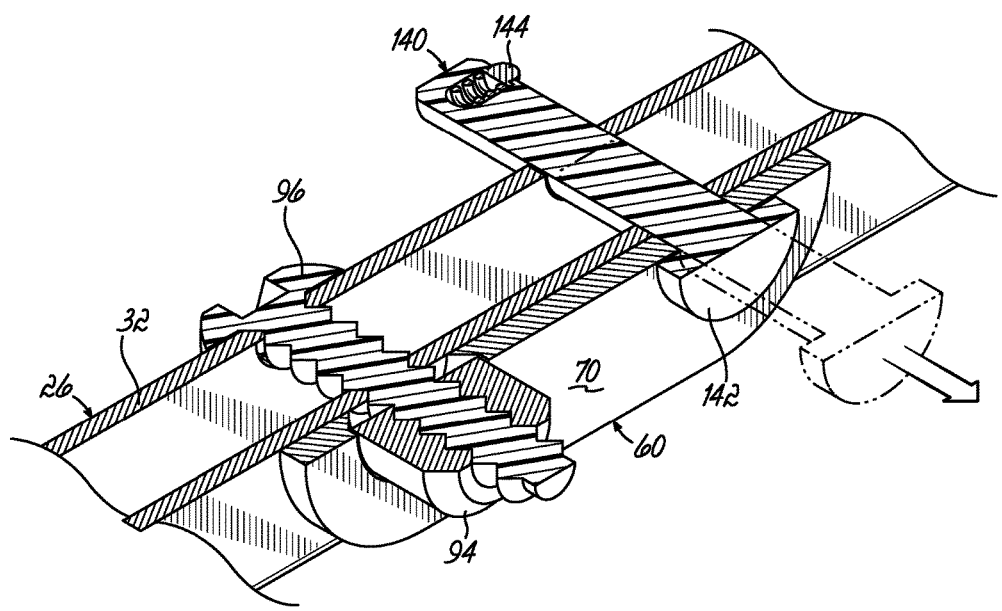
FIG. 4A is a cross-sectional view like FIG. 4 illustrating another embodiment.

More specifically, as shown in FIGS. 2, 3A and 3B, a threaded bolt 96 passes through the upper opening 66 in one of the left-hand spacers 60 and through openings in the rectangular tubing of either the perimeter member 46 or the middle member 52 of the first deck 44. As best shown in FIGS. 4 and 4A, the threaded bolt 96 is secured in place by a threaded nut 94, as is known in the art. The fastener, bolt 96 and nut 94, pivotally secures the left-hand spacer 60 to the first upper deck 44. Another bolt 96 passes through the opening 68 in the leg 70 of one of the left-hand spacers 60 and through openings in the rectangular tubing of either the U-shaped perimeter member 28 or the middle member 38 of the first base 26 and is secured by a threaded nut 94. The bolt 96 and nut 94 (fastener) pivotally secures the left-hand spacer 60 to the first base 26.

Similarly, for each of the three right-hand spacers 62 used in the first section 16 of the foundation 10, a bolt 96 passes through the upper opening 82 in one of the right-hand spacers 62 and through openings in the rectangular tubing of the perimeter member 46 of the first deck 44 and is secured by a threaded nut 94, as is known in the art. The fastener, bolt 96 and nut 94, pivotally secures the right-hand spacer 62 to the first upper deck 44. Another bolt 96 passes through the opening 90 in the leg 86 of one of the right-hand spacers 62 and through openings in the rectangular tubing of the U-shaped member 28 of the first base 26 and is secured by a threaded nut 94. The bolt 96 and nut 94 (fastener) pivotally secures the right-hand spacer 62 to the first base 26. Thus, each of the spacers, right-handed or left-handed, remains connected to the first base 26 and first upper deck 44 regardless of whether the foundation is erected or collapsed.

As best shown in FIG. 1A, the second section 18 of the bedding foundation 10 comprises a second base 100 comprising a generally U-shaped perimeter member 102 made of rectangular tubing. The hollow generally U-shaped perimeter member 102 comprises an end member 104 and a pair of opposed parallel sides 106 joined together with corner members 34. Although the generally U-shaped perimeter member 102 is shown comprising multiple members joined together, the generally U-shaped member 102 may be made of any number of pieces, including a single piece of rectangular tubing. The second base 100 further comprises transversely extending cross members 108, each cross member 108 being made of rectangular tubing and extending between and secured to one of the sides 106 of the generally U-shaped base member 102 and the middle base member 110. The second base 100 further comprises a longitudinally extending middle member 110 secured to and extending between the lower hinge assembly 22 and the end member 104 of the generally U-shaped second base member 102. The middle member 110 is made of rectangular tubing. The second base 100 further comprises two stability members 112, each stability member 112 extending between the middle member 110 and one of the sides 106 of the generally U-shaped second base member 102 and being spaced from the end member 104 of the generally U-shaped second base member 102 with at least one stabilizer 114.

As shown in FIGS. 1A and 2, the second section 18 of the collapsible bedding foundation 10 further comprises a second upper deck 116 comprising a second perimeter deck member 118 made of rectangular tubing. The second perimeter deck member 118 has two ends 120 and two sides 122. Although the second generally rectangular perimeter deck member 118 of the second section 18 is shown comprising multiple members joined together, the generally rectangular perimeter deck member 118 of the second section 18 may be made of a single piece of rectangular tubing.

The second upper deck 116 further comprises a longitudinally extending middle member 124 secured to and extending between the ends 120 of the second perimeter deck member 118. The middle member 124 is made of rectangular tubing. The second upper deck 116 further comprises two end cross members 126 and two middle cross members 128. Each cross member 126, 128 extends between the middle member 124 and one of the sides 122 of the second perimeter deck member 118. As best shown in FIG. 2, the second upper deck 116 further comprises a plurality of spaced, parallel longitudinally extending deck wires 58 secured to one end 120 of the second perimeter deck member 118 (closest the hinges) and one of the end cross members 126 by welding. The longitudinally extending deck wires 58 are further secured to the middle cross members 128.

Figure 1C:
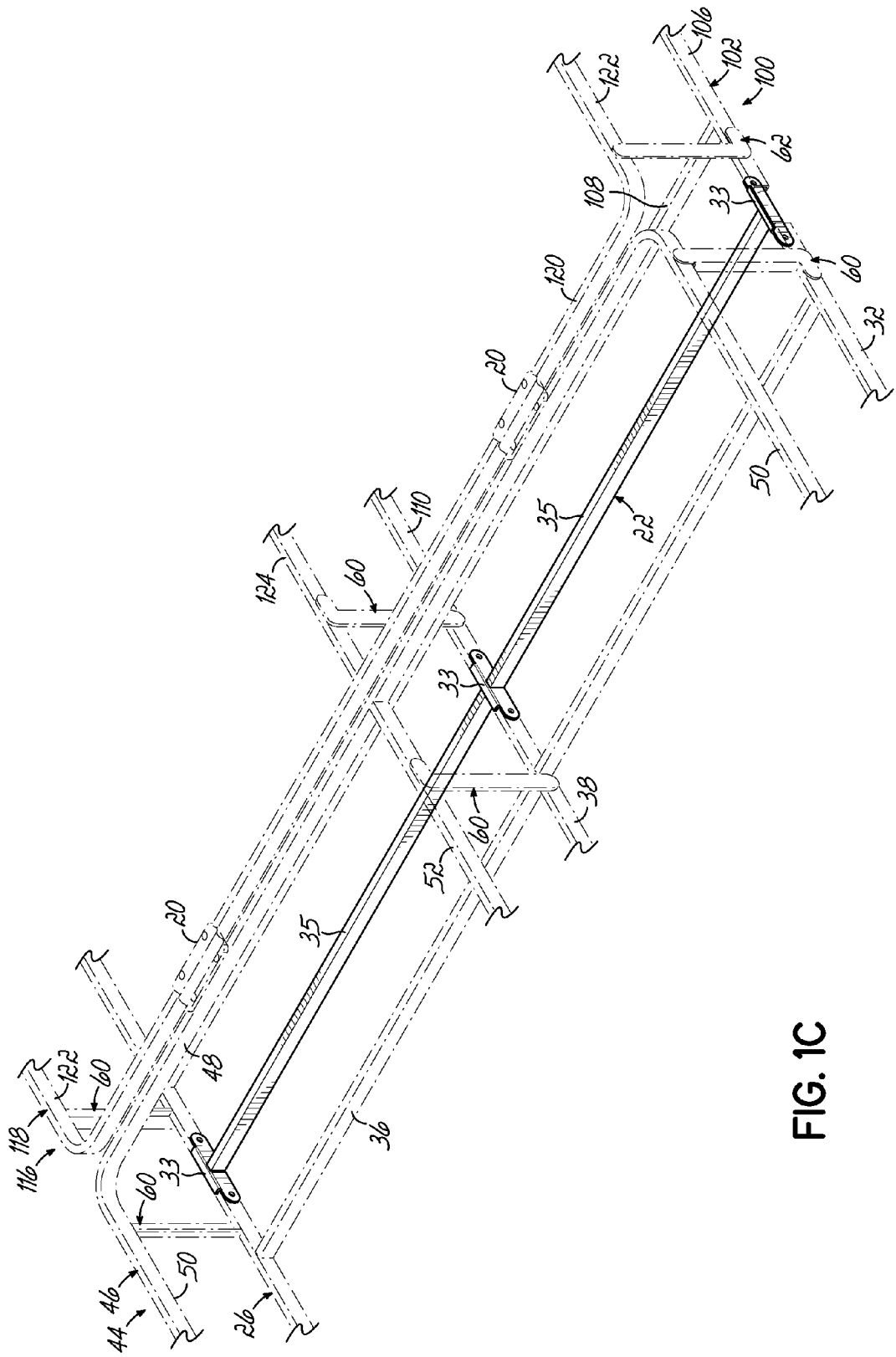
FIG. 1 is a perspective view of one embodiment of the collapsible bedding foundation in an erected condition with a removable cover.

As best illustrated in FIGS. 1A and 1C, the first and second sections 16, 18 of the bedding foundation 10 are connected to each other with two upper hinges 20 and a lower hinge assembly 22. Each upper hinge 20 connects the first upper deck 44 to the second upper deck 116 and, more particularly, connects the perimeter member 46 of the first upper deck 44 to the perimeter member 118 of the second upper deck 116. In one embodiment, illustrated in FIG. 2, each upper hinge 20 is secured onto the perimeter members 46,118 of the first and second upper decks 44, 116, respectively, with fasteners 130. Each upper hinge 20 functions to space the first upper deck 44 from the second upper deck 116 and is preferably made of plastic, but may be made of any other suitable material. In accordance with the present invention, each upper hinge may assume other configurations and be made of any suitable material. Although two upper hinges 20 are illustrated, any number of upper hinges, including a single hinge, may be used.

Figure 10:
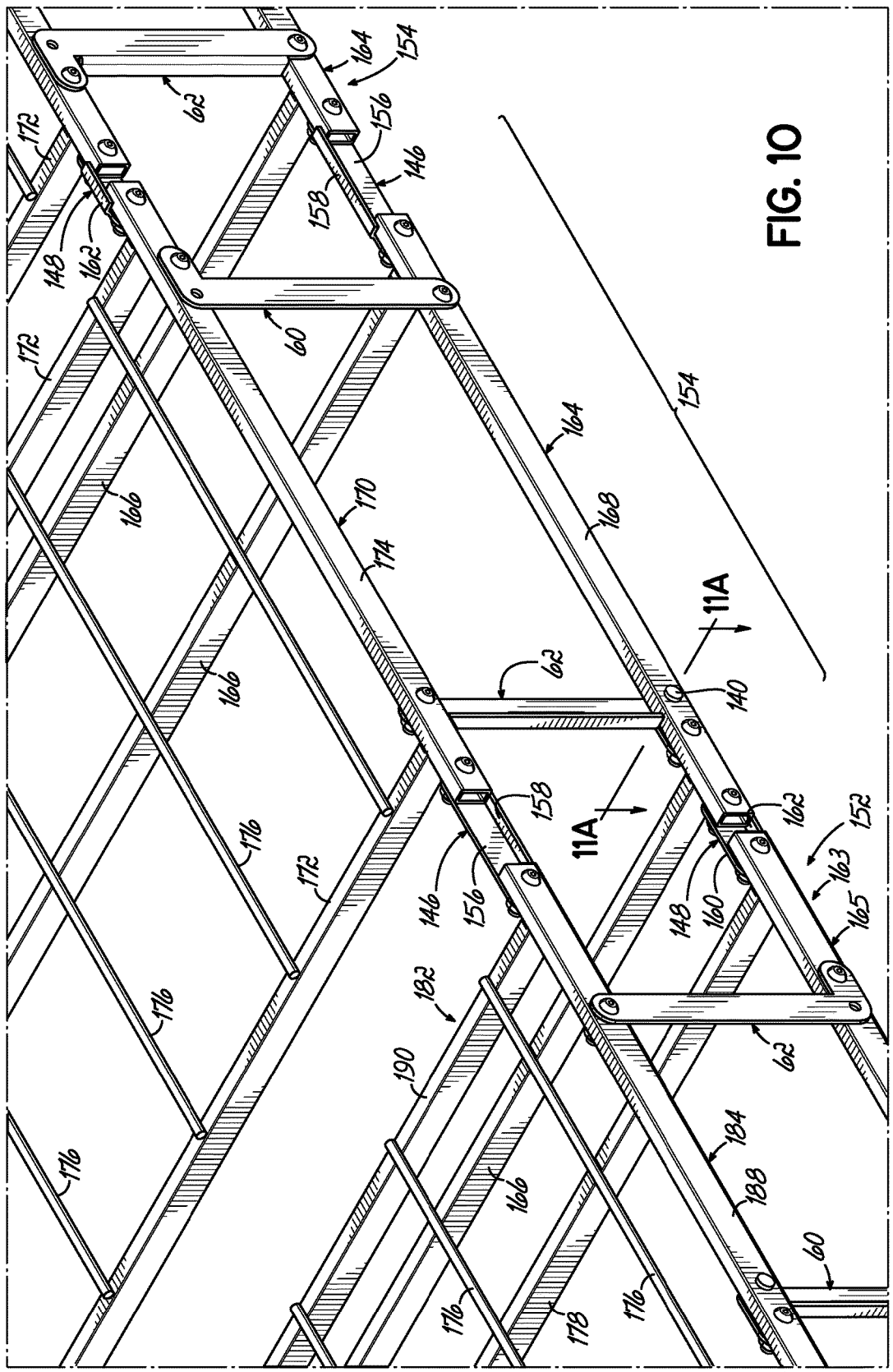
FIG. 10 is a perspective view of a portion of the collapsible bedding foundation of FIG. 1 without any covering illustrating the lower hinge assembly.

As best seen in FIG. 10, the lower hinge assembly 22 connects the first base 26 to the second base 100. More particularly, the lower hinge assembly 22 connects the sides 32 of the generally U-shaped perimeter member 28 of the first base 26 to the sides 106 of the generally U-shaped perimeter member 102 of the second base 100 along with connecting the middle members 38, 110 of the first and second bases, respectively. As best shown in FIGS. 1C and 2, the lower hinge assembly 22 is a unitary metal member comprising three linear hinges 33 connected with two straight connectors 35. As best illustrated in FIG. 2, each of the linear hinges 33 is hingedly secured to and extends between the first and second bases 26, 100, respectively, with nuts 94 and bolts 96. Other means of securing the lower hinge assembly 22 to the bases 26, 100 may be used if desired. The lower hinge assembly may assume other configurations and be made of any suitable material.

As best seen in FIG. 1A, a column of spacers, one left-hand spacer 60 and two right-hand spacers 62, are pivotally connected to the far side 106 of the generally U-shaped member 102 of second base 100 and the far side 122 of the perimeter member 118 of the second upper deck 116. Additionally, another column of spacers, one right-hand spacer 62 and two left-hand spacers 60, are pivotally connected to the near side 106 of the generally U-shaped member 102 of second base 100 and the near side 122 of the perimeter member 118 of the second upper deck 116. Lastly, a third column of spacers, three left-hand spacers 60, are pivotally connected to the middle member 110 of the second base 100 and the middle member 124 of the second upper deck 116.

As best shown in FIG. 2, the flanges 72, 92 of the left-hand spacers 60 and right-hand spacers 62, respectively, function to support the upper decks 44, 116 when the foundation 10 is erected. They further function to prevent the collapse of the upper decks relative to the bases of the two sections.

FIGS. 3A, 3B and 4 illustrate one locking mechanism to maintain the foundation 10 in an erected position or condition. As best shown in FIG. 4, locking members in the form of spring clips 132 may be located inside the hollow interior of the sides 32, 106 of the generally U-shaped perimeter members 28, 102, respectively, of the first and second bases 26, 100. The location of the spring clips 132 is shown by the eight encircled areas 134 shown in FIG. 1B (four per section). As shown in FIGS. 3A and 4, each spring clip 132 has a push pin portion 136 which is adapted to fit through one of the openings 68 in a left-hand spacer 60 and/or one of the openings 84 in a right-hand spacer 62. See FIGS. 5A and 5B. As shown in FIGS. 3A and 3B, the push pin portion 136 of each of the four locking members or spring clips 132 per section must be depressed in order to rotate a section relative to the lower hinge assembly 22. The lower hinge assembly 22 remains stationary during the collapsing process.

Figure 7:
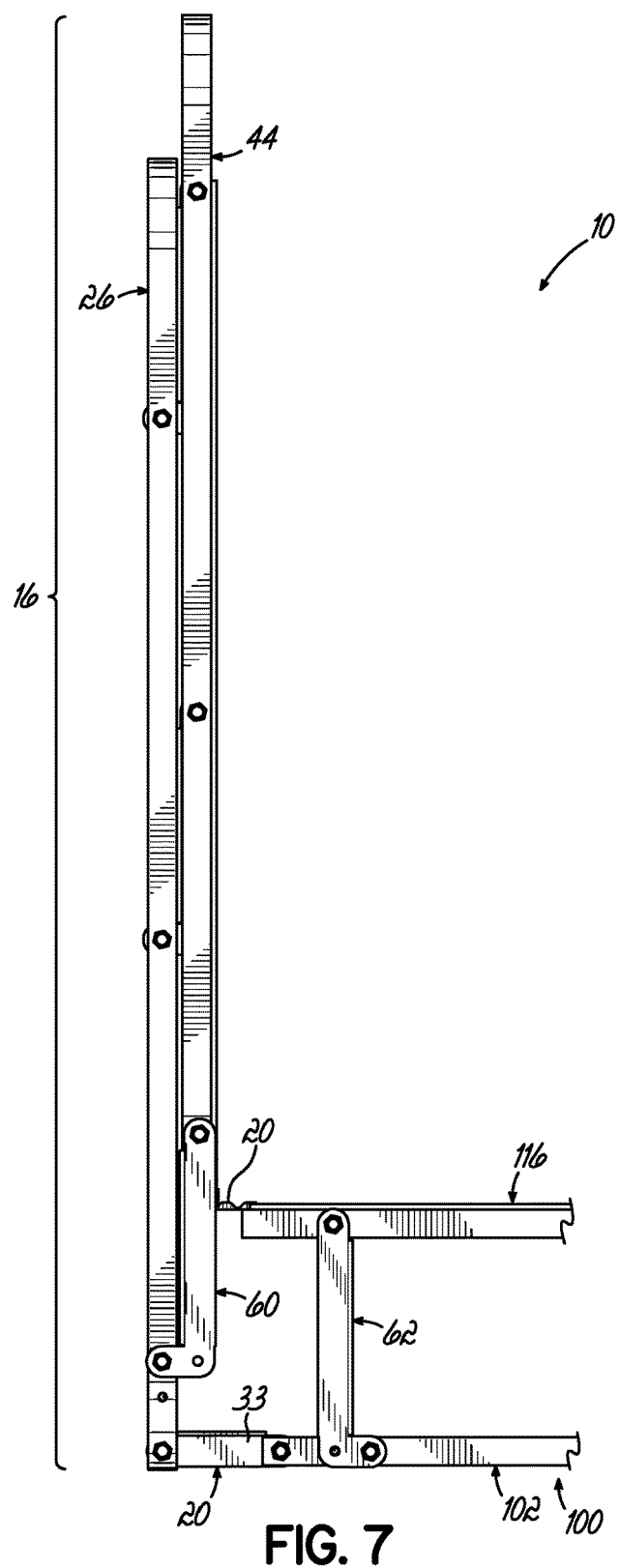
FIG. 7 is a side elevational view of a portion of the bedding foundation of FIG. 1A being partially collapsed.
Figure 8:
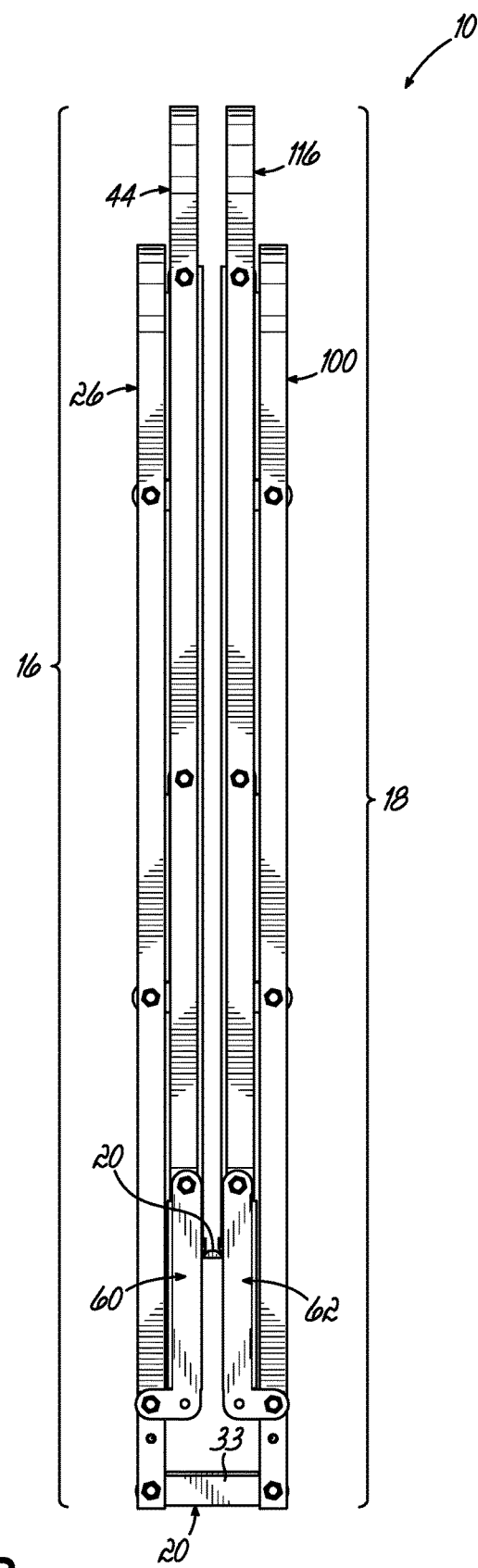
FIG. 8 is a side elevational view of the bedding foundation of FIG. 1A being fully collapsed.

FIG. 6 illustrates the first section 16 being moved upwardly in the direction of arrows 138 to raise the first section 16 relative to the second section 18 and partially collapse the foundation 10. FIG. 7 illustrates the first section 16 being fully collapsed. FIG. 8 illustrates the first and second sections 16, 18 being fully collapsed.

FIG. 4A illustrates another type of locking member which may be used in place of spring clips 132. In this embodiment, a removable locking pin 140 having a head 142 and a spring loaded stopper 144 may be used in each of the eight encircled areas 134 of FIG. 1B. To collapse the foundation 10, each of the locking pins 140 must be removed.

FIGS. 9-14D illustrate an alternative embodiment of collapsible bedding foundation 10a, which has four hinged sections. The collapsible bedding foundation 10a has a pair of end surfaces 12a defining a length or longitudinal dimension La of the foundation 10a and a pair of opposed side surfaces 14a defining a width Wa of the foundation 10a.

Figure 9:
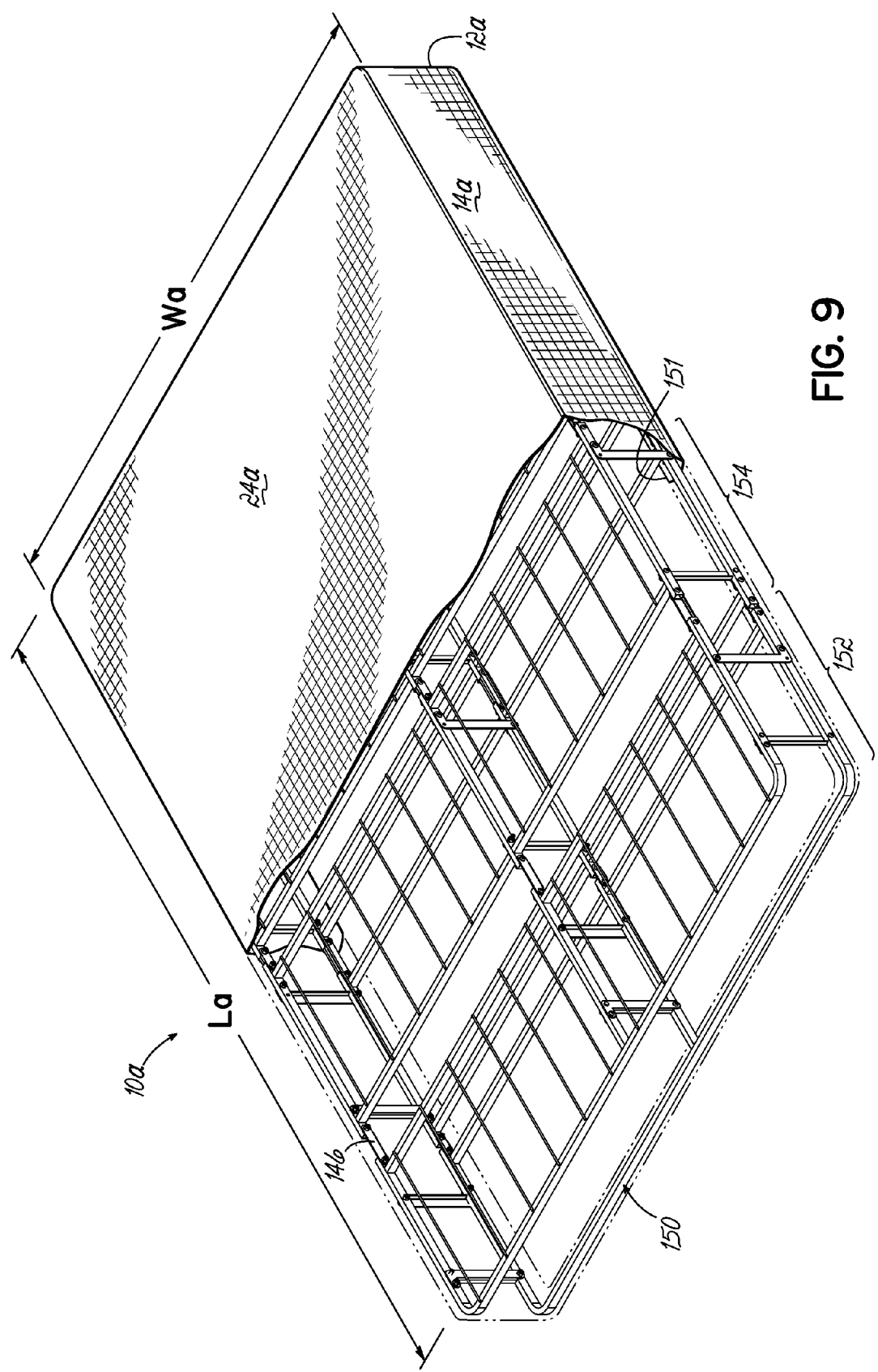
FIG. 9 is a perspective view of another embodiment of collapsible bedding foundation in an erected condition with a removable cover.
Figure 9A:
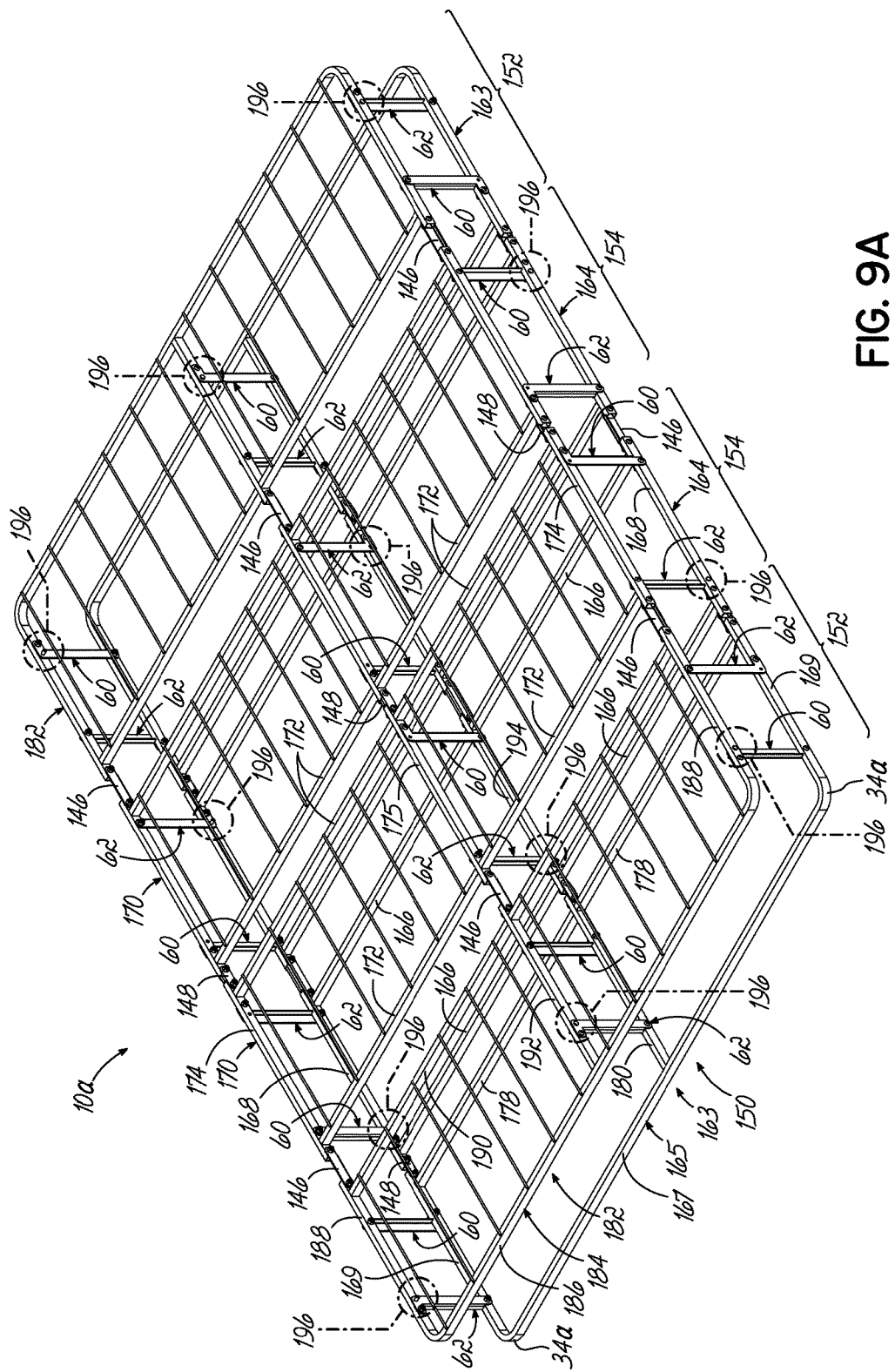
FIG. 9A is a perspective view of the collapsible bedding foundation of FIG. 9 without any covering.

The bedding foundation 10a comprises a core 150 shown in detail in FIG. 9A comprising two end sections 152 and two middle sections 154 hinged together. The hinges 146, 148 enable the bedding foundation 10a to move from an erected position shown in FIGS. 9 and 9A to a collapsed position shown in FIG. 14D. Although the drawings (except FIG. 9) illustrate this embodiment of bedding foundation 10a with no cover, the bedding foundation 10a may be collapsed with a removable cover 24a as partially shown in FIG. 9. If desired, padding (not shown) may be placed on an upper surface of the bedding product 10a before the cover 24a is attached. The cover 24a is illustrated having an elastic band 151 at the bottom thereof. However, any removable cover, including the zippered cover 24 illustrated in FIG. 1, may be used.

The core 150 of bedding foundation 10a has each end section 152 hinged to a middle section 154 with multiple long and short hinges 146, 148, respectively. Similarly, the two middle sections 154 are hinged together with multiple long and short hinges 146, 148, respectively.

As best shown in FIG. 10, each long hinge 146 is the same size, and each short hinge 148 is the same size. However, the long hinges 146 are greater in length than the short hinges 148. As best shown in FIG. 10, each long hinge 146 has a generally planar body portion 156 and a flange 158 extending generally perpendicular to the body portion 156. Each short hinge 148 has a generally planar body portion 160 and a flange 162 extending generally perpendicular to the body portion 160. The hinges 146, 148 enable the core 150 of bedding foundation 10a to move from an erected position shown in FIG. 9A to a fully collapsed position shown in FIG. 14D.

As best shown in FIGS. 9A and 10, each end section 152 is hingedly secured to its adjacent middle section 154 with three upper long hinges 146 and three lower short hinges 148. When the foundation 10a is fully erect, as shown in FIG. 9A, each short hinge 148 is below one of the long hinges 146 at the juncture of an end section 152 and a middle section 154. As best shown in FIG. 10, the two middle sections 154 are hingedly secured together with three upper short hinges 148 and three long short hinges 146. When the foundation 10a is fully erect, as shown in FIG. 9A, each short hinge 148 is above one of the long hinges 146 at the juncture of the middle sections 154.

Referring to FIG. 9A, each end section 152 comprises a base 163 comprising a generally U-shaped member 165 made of rectangular tubing as defined hereinabove. The hollow generally U-shaped member 165 comprises an end member 167 and a pair of opposed parallel sides 169 joined together with corner members 34a. Although the generally U-shaped member 165 is shown comprising multiple members joined together, the generally U-shaped member 165 may be made of a single piece of rectangular tubing. The base 163 further comprises two transversely extending cross members 178, each being made of rectangular tubing. Each cross member 178 extends between, and is secured to, one of the sides 169 of the generally U-shaped base member 165 and a longitudinally extending middle member 180. The middle member 180 is secured to and extends between the hinge 148 and the end member 167 of the generally U-shaped base 163. The base middle member 180 is made of rectangular tubing.

As shown in FIGS. 9 and 9A, each end section 152 of the core 150 of the collapsible bedding foundation 10a further comprises an upper deck 182 comprising a generally U-shaped deck member 184 made of rectangular tubing. The generally U-shaped deck member 184 has one end 186 and two sides 188. Although the generally U-shaped deck member 184 is shown comprising multiple members joined together, the generally rectangular U-shaped deck member 184 may be made of a single piece of rectangular tubing. The upper deck 182 further comprises two transversely extending cross members 190, each being made of rectangular tubing. Each cross member 190 extends between, and is secured to, one of the sides 188 of the generally U-shaped deck member 184.

The upper deck 182 further comprises a longitudinally extending middle member 192 secured to and extending between the end 186 of the generally U-shaped deck member 184 and the transversely extending cross member 190. The middle member 192 is made of rectangular tubing. As best shown in FIG. 10, the upper deck 182 further comprises a plurality of spaced, parallel longitudinally extending deck wires 176 secured to end 186 of the generally U-shaped deck member 184 and cross member 190 of upper deck 182 by welding.

Referring to FIG. 9A, each middle section 154 comprises a base 164 comprising a pair of transversely extending cross members 166, each being made of rectangular tubing. The base 164 of each middle section 154 further comprises a pair of longitudinally extending end connecting members 168 and a middle connecting member 194, each being made of rectangular tubing. As best shown in FIG. 10, the three connecting members 168, 194 and cross members 166 of each base 164 of each middle section 154 are welded together.

As shown in FIGS. 9A and 10, each middle section 154 of the core 150 of the collapsible bedding foundation 10a further comprises an upper deck 170, a pair of transversely extending cross members 172, each being made of rectangular tubing. The upper deck 170 of each middle section 154 further comprises a pair of longitudinally extending end connecting members 174 and a middle connecting member 175, each being made of rectangular tubing. As best shown in FIG. 10, the connecting members 174, 175 and cross members 172 of each upper deck 170 of each middle section 154 are welded together. The upper deck 170 of each middle section 154 further comprises a plurality of spaced, parallel longitudinally extending deck wires 176 extending between and secured to cross members 172 of upper deck 170 by welding.

As best seen in FIGS. 9A, 10 and 12, each of the end and middle sections 152, 154 of the collapsible bedding foundation 10a further comprises multiple L-shaped spacers 60, 62 shown in detail in FIGS. 5A and 5B. Each L-shaped spacer 60, 62 of each end section 152 is pivotally connected to the base 163 and the upper deck 182. As best seen in FIG. 9A, three columns of spacers 60, 62 space the upper deck 182 above the base 163 and lock the foundation in a stationary position when the foundation is in its erected position and the locking members are secured in place.

In each end section 152, a column of spacers (each column having one left-hand spacer 60 and one right-hand spacer 62) are pivotally connected to the far side 169 of the generally U-shaped base member 163 and the far side 188 of the generally U-shaped deck member 184 of the upper deck 182. Additionally, another column of spacers, one right-hand spacer 62 and one left-hand spacer 60, are pivotally connected to the near side 169 of the generally U-shaped base member 163 and the near side 188 of the generally U-shaped deck member 184 of the upper deck 116. Lastly, a third or middle column of spacers, one left-hand spacer 60 and one right-hand spacer 62, are pivotally connected to the middle member 180 of the base 163 and the middle member 192 of the upper deck 182.

Similarly, in each middle section 154, a column of spacers, one left-hand spacer 60 and one right-hand spacer 60, are pivotally connected to each end connecting member 168 of the base 164 and each end connecting member 174 of the upper deck 170. Additionally, a third or middle column of spacers, one left-hand spacer 60 and one right-hand spacer 62, are pivotally connected to the middle connecting member 194 of the base 164 and the middle connecting member 175 of the upper deck 170.

Figure 11A:
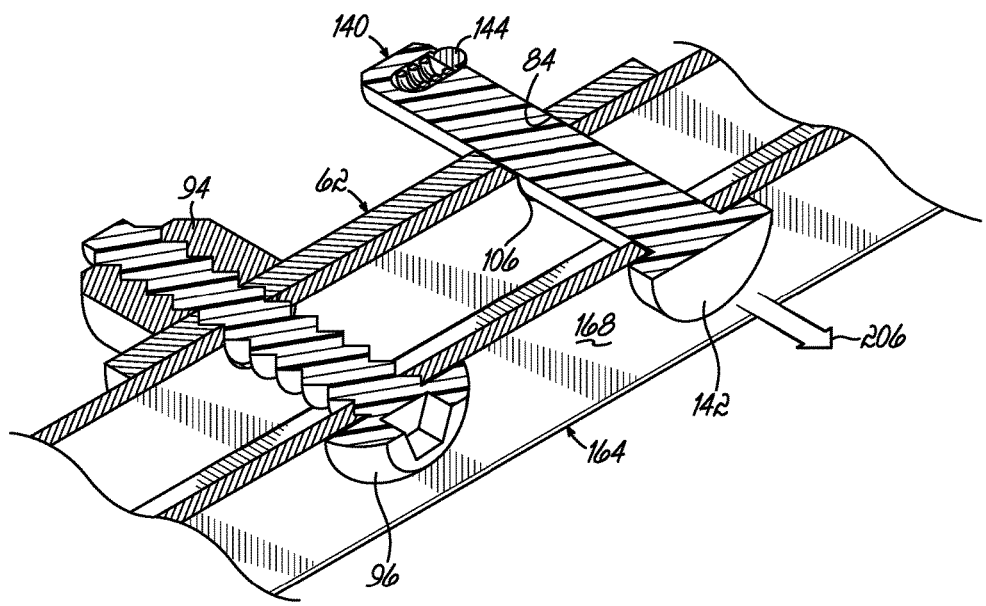
FIG. 11A is a cross-sectional view taken along the line 11A-11A of FIG. 10.
Figure 11B:
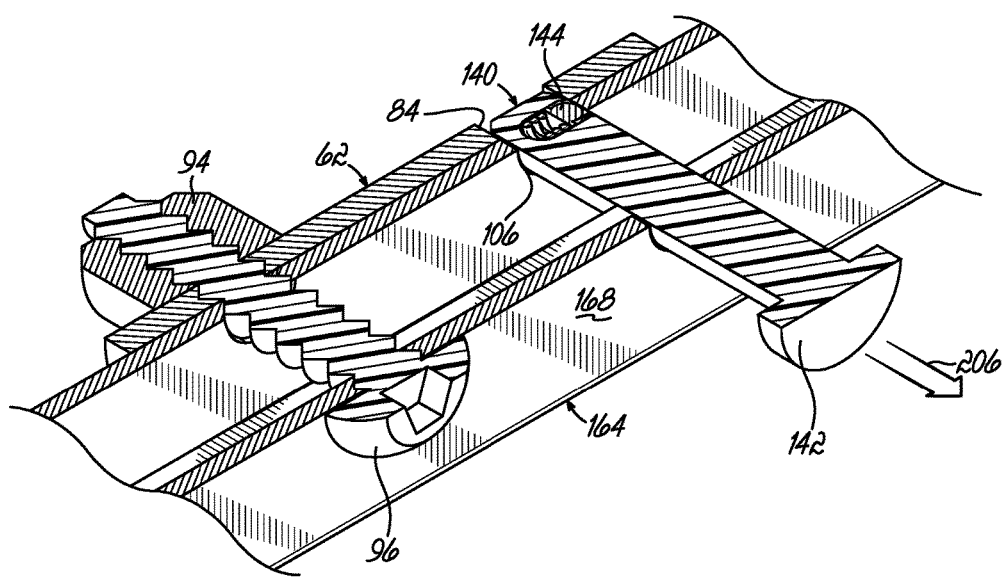
FIG. 11B is a cross-sectional view like FIG. 11A showing the locking pin being pulled out to allow the foundation to collapse.
Figure 13:
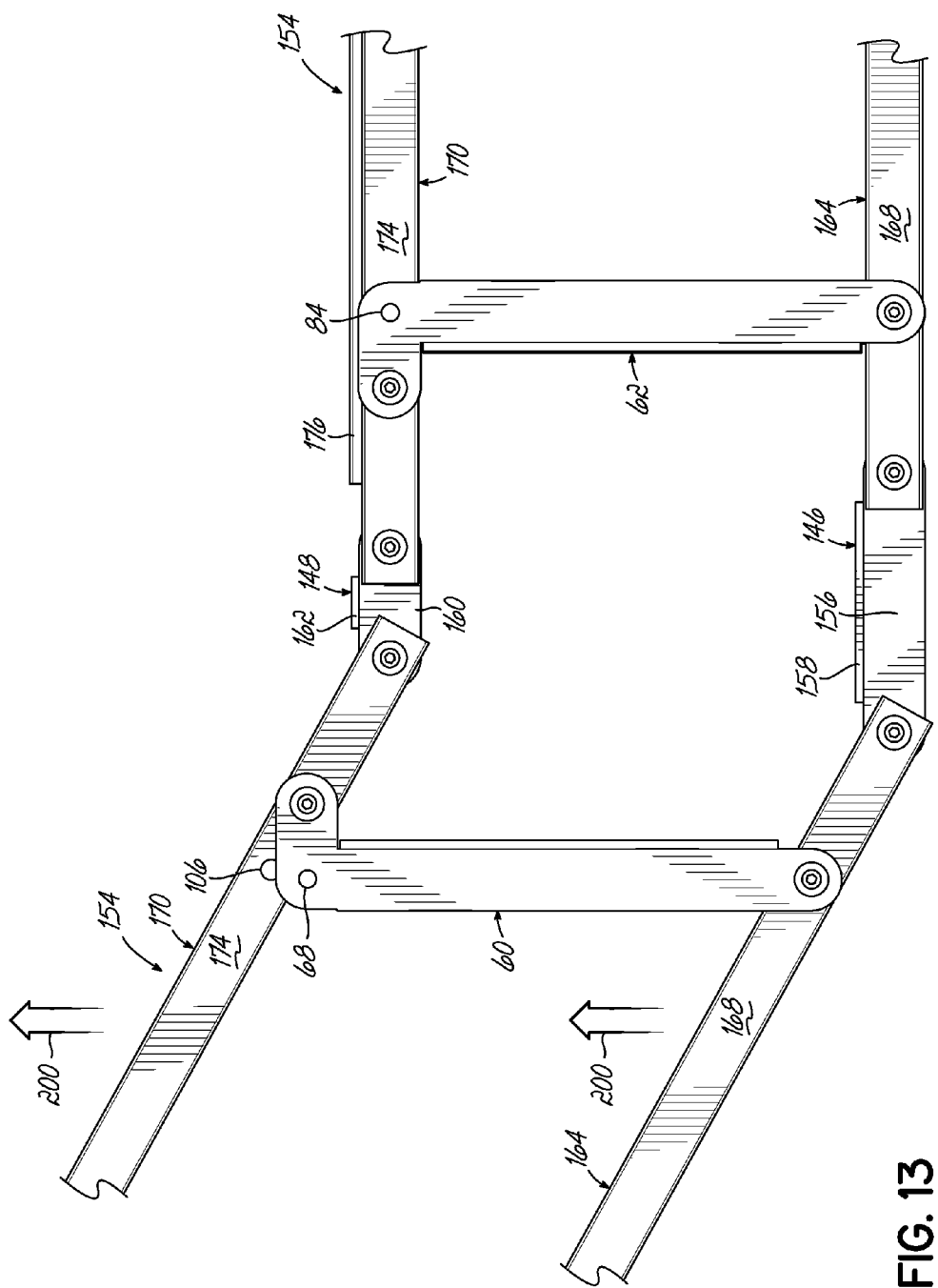
FIG. 13 is a side elevational view of a portion of the bedding foundation of FIG. 9A being collapsed.

FIGS. 11A and 11B illustrate locking pin 140 having a head 142 and a spring-loaded stopper 144 described above located only in each of the encircled areas 196 of FIG. 9A. To collapse the foundation core 150 after the removable cover has been removed, each of the twelve locking members 140 must be removed by moving the locking member 140 in the direction of arrow 206 shown in FIGS. 11A and 11B. To lock the foundation core 150 in its erected position, each locking member 140 must be inserted through an opening 68, 84 in one of the L-shaped spacers 60, 62, respectively, and through openings 106 in the opposed walls of the rectangular tubing of the base connecting members of one of the sections 152, 154 (see FIG. 12).

Figure 14A:
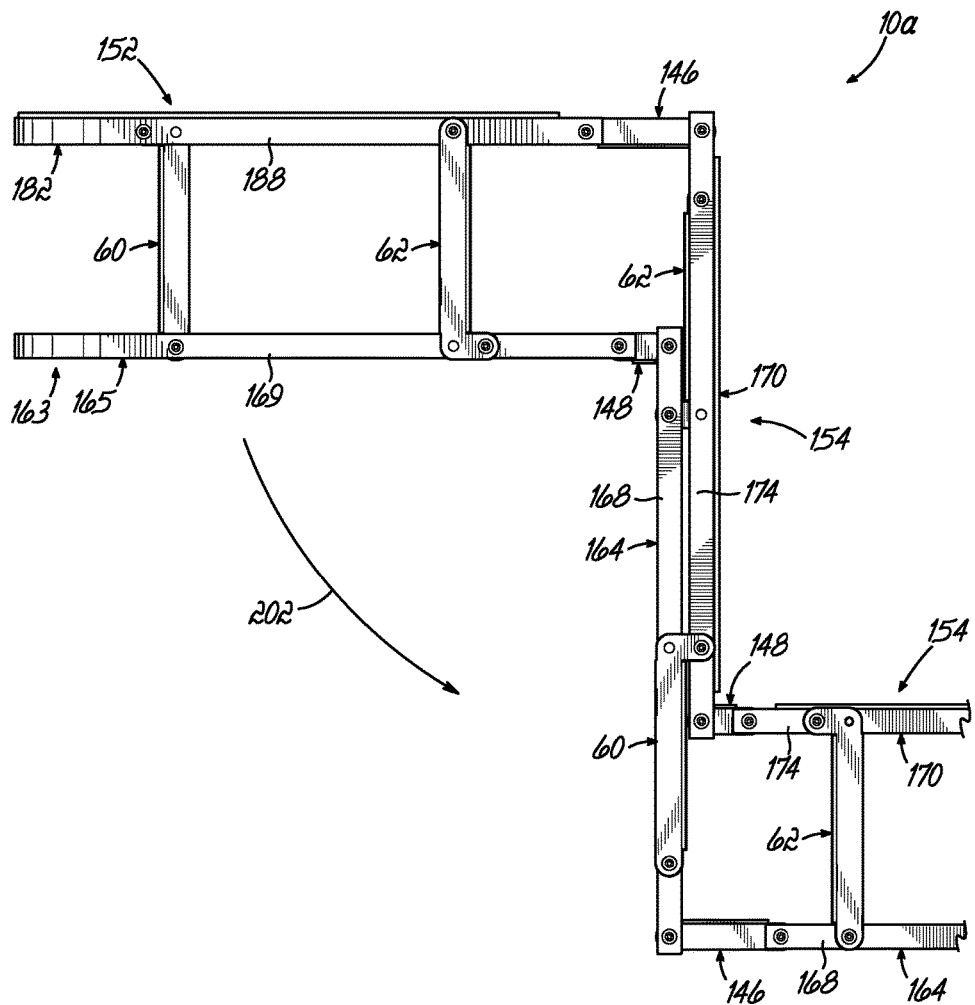
FIG. 14A is a side elevational view of a portion of the bedding foundation of FIG. 9A being partially collapsed.
Figure 14B:
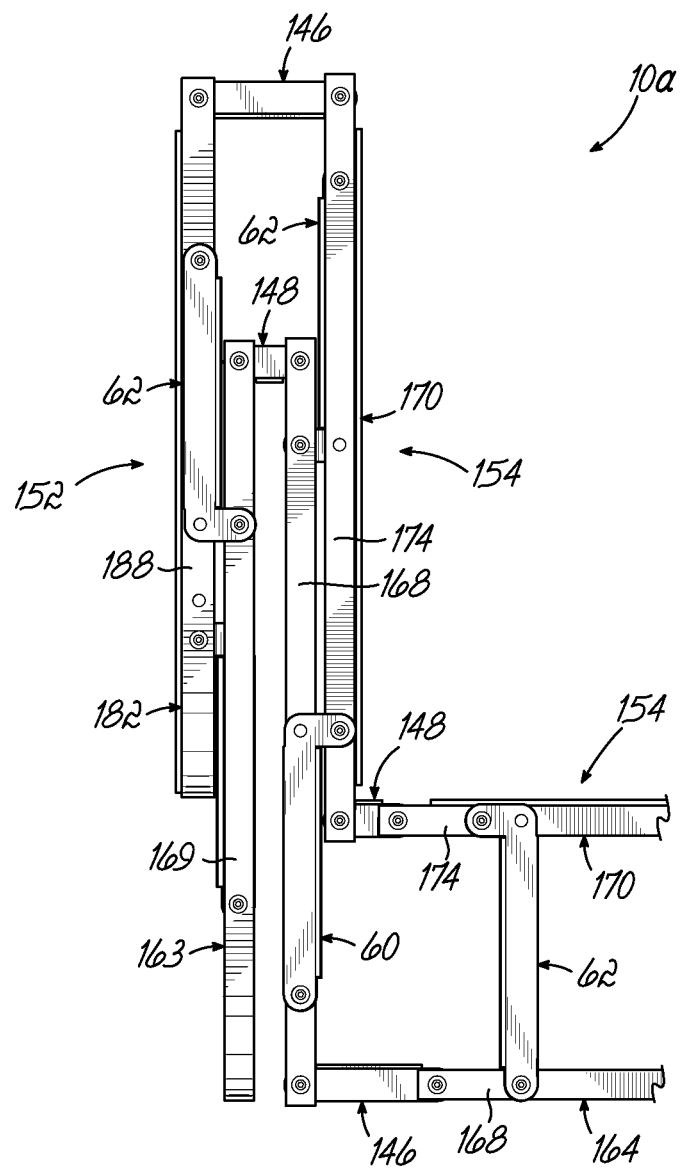
FIG. 14B is a side elevational view of a portion of the bedding foundation of FIG. 9A being partially collapsed.
Figure 14C:
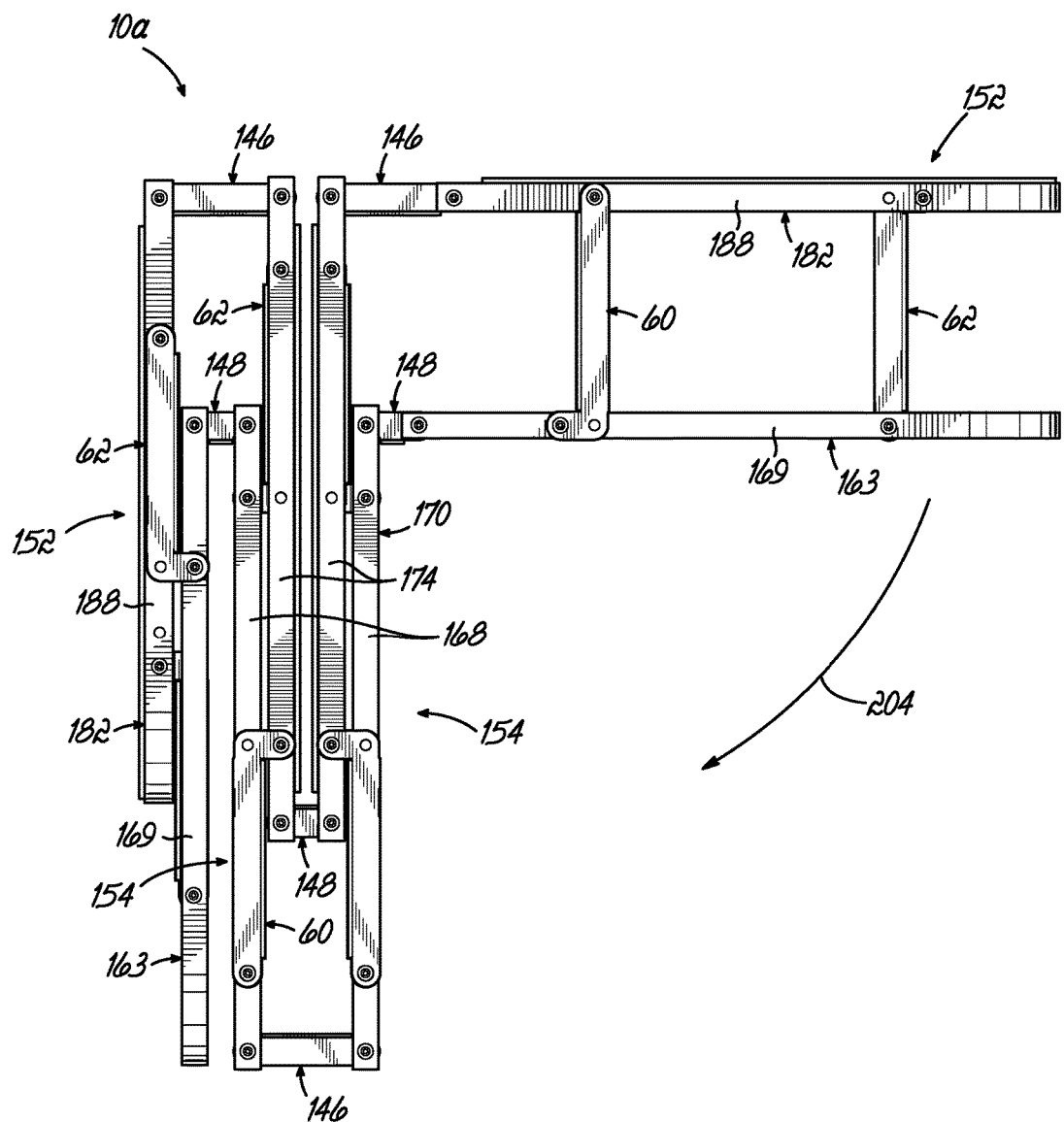
FIG. 14C is a side elevational view of a portion of the bedding foundation of FIG. 9A being partially collapsed.
Figure 14D:
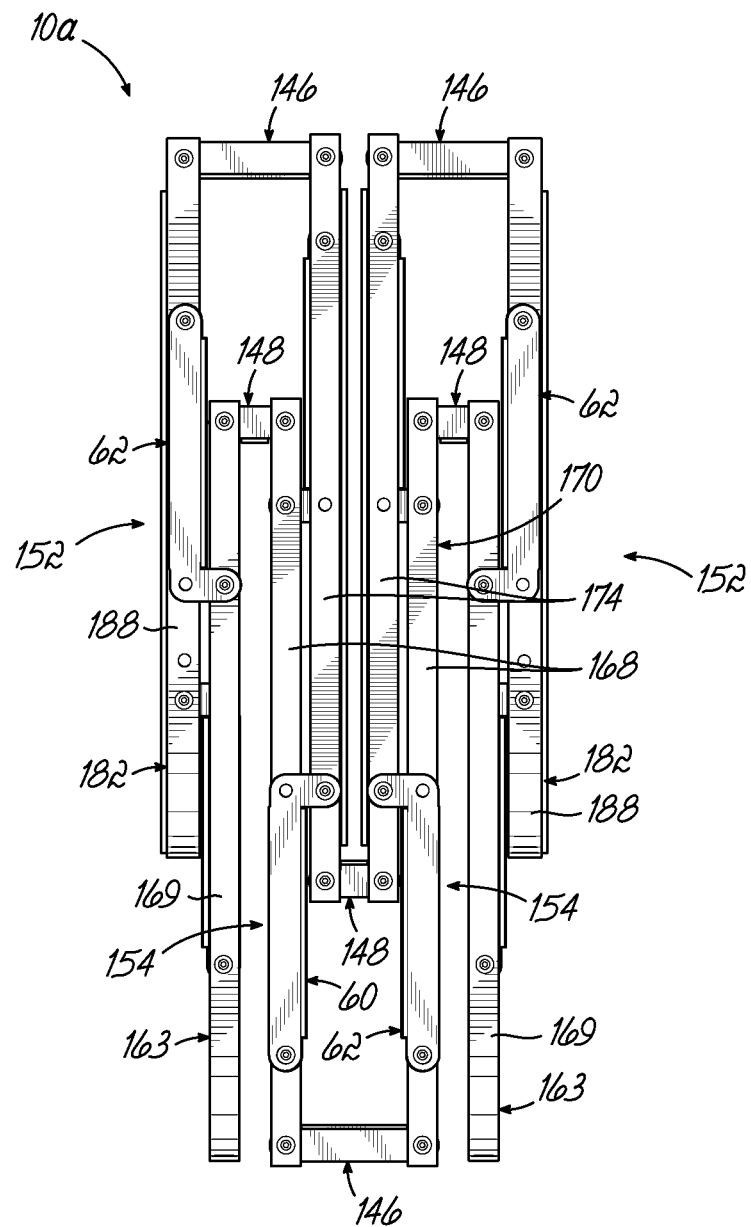
FIG. 14D is a side elevational view of the bedding foundation of FIG. 9A being fully collapsed.

FIGS. 14A-14D illustrate the method of collapsing the foundation 10a. FIG. 12 illustrates one of the middle sections 154 being moved from a horizontal position to a vertical position by raising the middle section 154 in the direction of arrows 200 shown in FIG. 12 after three locking pins 140 (shown in FIG. 9A) have been removed (only one being shown in FIG. 12). FIG. 14A illustrates the foundation 10a with the middle section 154 in a vertical position. FIG. 14A illustrates the leftmost end section 152 being moved in the counter-clockwise direction shown by the arrow 202. FIG. 14B illustrates the leftmost end section 152 being collapsed and located adjacent the leftmost middle section 154. FIG. 14C illustrates the rightmost end section 152 being moved in the clockwise direction shown by the arrow 204. FIG. 14D illustrates the foundation in its fully collapsed position for storage or shipment, the rightmost end section 152 being collapsed and located adjacent the rightmost middle section 154.

FIGS. 15-25 illustrate an alternative embodiment of collapsible bedding foundation 10b, which has three hinged sections. The collapsible bedding foundation 10b has a pair of end surfaces 12b (only one being shown) defining a length or longitudinal dimension Lb of the foundation 10b and a pair of opposed side surfaces 14b (only one being shown) defining a width Wb of the foundation 10b.

Figure 15:
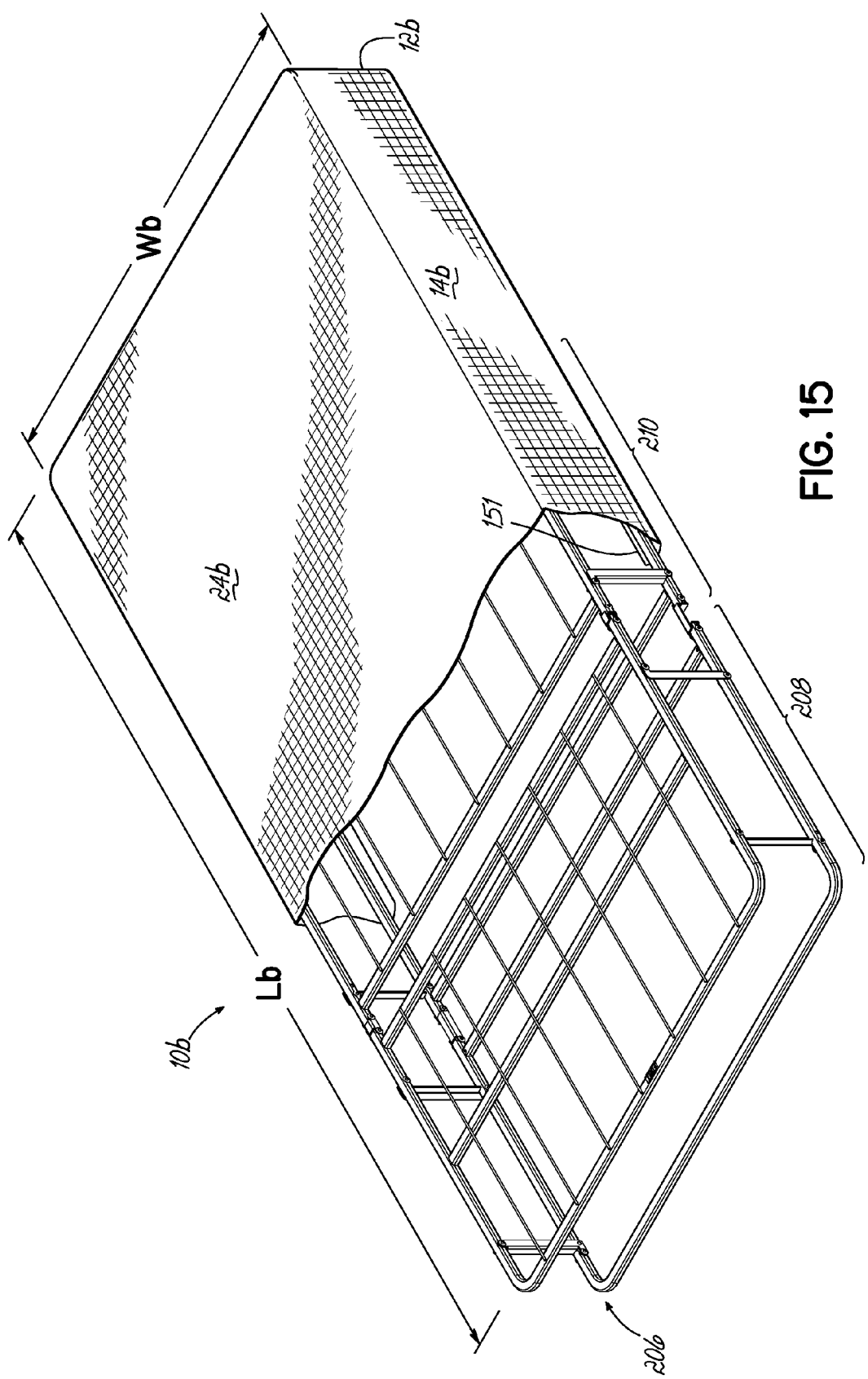
FIG. 15 is a perspective view of another embodiment of collapsible bedding foundation in an erected condition with a removable cover.
Figure 15A:
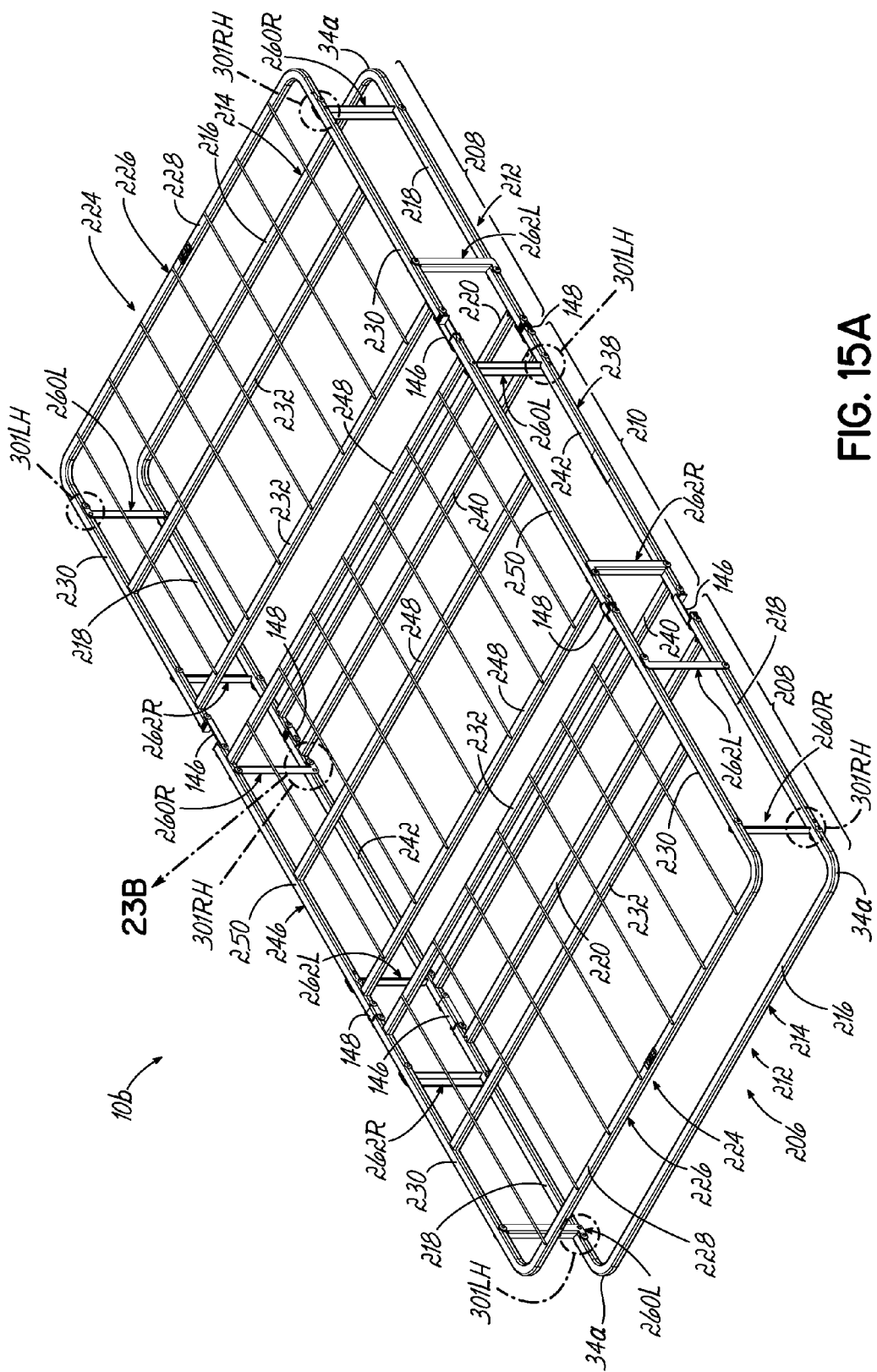
FIG. 15A is a perspective view of the collapsible bedding foundation of FIG. 15 without any covering.

The bedding foundation 10b comprises a core 206 shown in detail in FIG. 15A comprising two end sections 208, each being hinged to a middle section 210. The hinges 146, 148 enable the bedding foundation 10b to move from an erected position shown in FIGS. 15 and 15A to a collapsed position shown in FIG. 25C. Although the drawings (except FIG. 15) illustrate this embodiment of bedding foundation 10b with no cover, the bedding foundation 10b may be collapsed with a removable cover 24b as partially shown in FIG. 15. If desired, padding (not shown) may be placed on an upper surface of the bedding product 10b before the cover 24b is attached. FIG. 15 illustrates cover 24b having an elastic band 151 at the bottom thereof. However, any cover, removable or not, including a zippered cover like the cover 24 illustrated in FIG. 1, may be used.

As best shown in FIG. 15A, the core 206 of bedding foundation 10b has each end section 208 hinged to the middle section 210 with one long hinge 146 and one short hinge 148. The long and short hinges 146, 148 are as described above. The hinges 146, 148 enable the core 206 of bedding foundation 10b to move from an erected position shown in FIG. 15A to a fully collapsed position shown in FIG. 25C.

Figure 16:
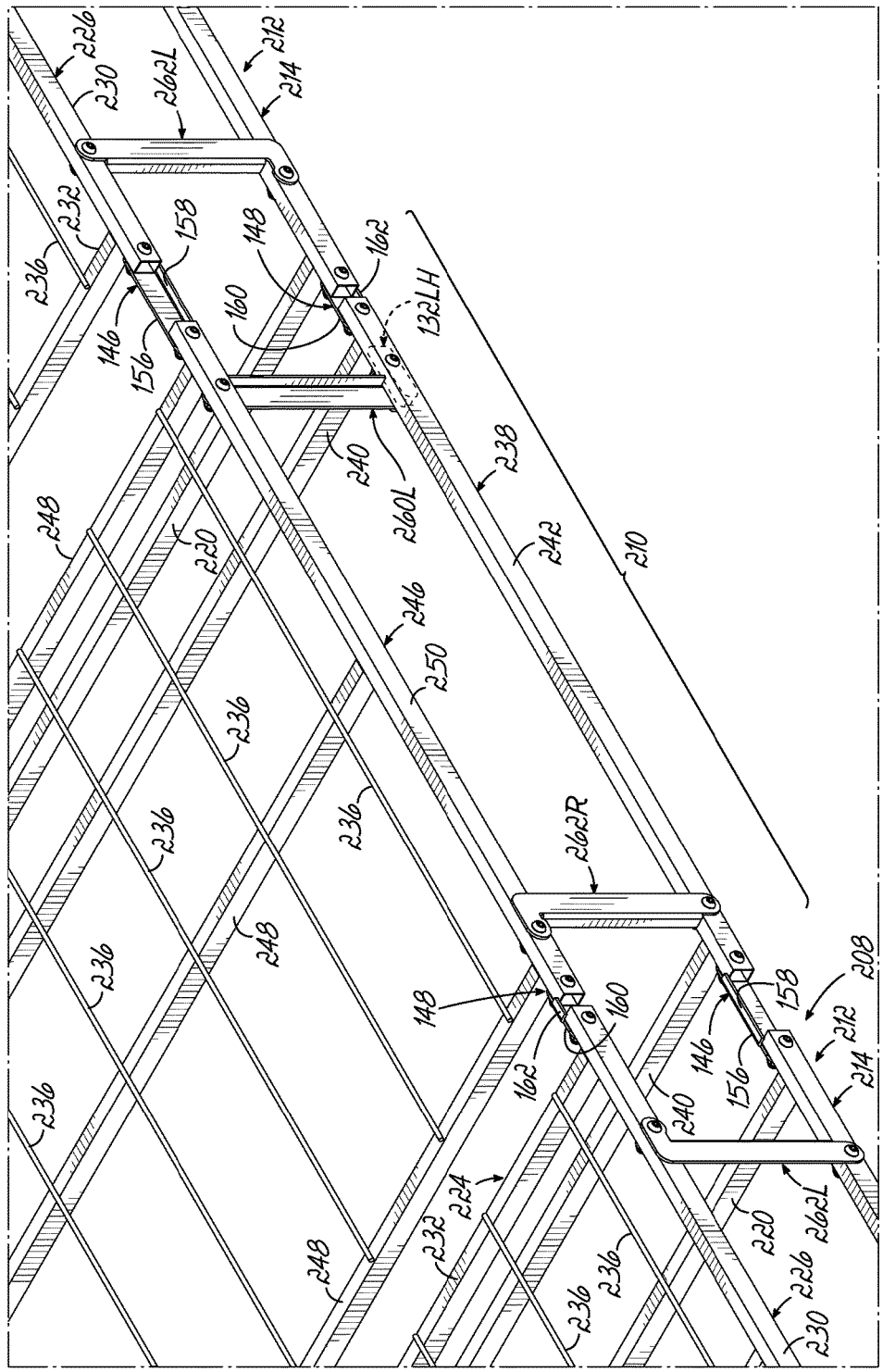
FIG. 16 is an enlarged perspective view of a portion of the collapsible bedding foundation of FIG. 15A.

As best shown in FIGS. 15A and 16, each end section 208 of core 206 is hingedly secured to the middle section 210 with two transversely spaced long hinges 146 and two transversely spaced short hinges 148. When the foundation 10b is fully erect, as shown in FIG. 15A, the short hinge 148 is below the long hinge 146 at the juncture of the end section 208 shown to the right in FIG. 15A and the middle section 210. As best shown in FIG. 15A, the short hinge 148 is above the long hinge 146 at the juncture of the end section 208 shown to the left in FIG. 15A and the middle section 210.

Referring to FIG. 15A, each end section 208 comprises a base 212 comprising a generally U-shaped member 214 made of rectangular tubing as defined hereinabove. The hollow generally U-shaped member 214 comprises an end member 216 and a pair of opposed parallel sides 218 joined together with corner members 34a, as described above. Although the generally U-shaped member 214 is shown comprising multiple members joined together, the generally U-shaped member 214 may be made of a single piece of rectangular tubing. The generally U-shaped member 214 of each base 212 further comprises a transversely extending cross member 220 made of rectangular tubing. Each cross member 220 extends between and is secured to one of the sides 218 of the generally U-shaped base member 214.

As shown in FIGS. 15 and 15A, each end section 208 of the core 206 of the collapsible bedding foundation 10b further comprises an upper deck 224 comprising a generally U-shaped deck member 226 made of rectangular tubing. The generally U-shaped deck member 226 has one end 228 and two sides 230. Although the generally U-shaped deck member 226 is shown comprising multiple members joined together, the generally rectangular U-shaped deck member 226 may be made of a single piece of rectangular tubing. The upper deck 224 further comprises two transversely extending cross members 232, each being made of rectangular tubing. Each cross member 232 extends between, and is secured to the sides 230 of the generally U-shaped deck member 226. As best shown in FIG. 16, the upper deck 224 further comprises a plurality of spaced, parallel longitudinally extending deck wires 236 secured to end 228 of the generally U-shaped deck member 226 and cross member 232 of upper deck 224 by welding.

Referring to FIGS. 15A and 16, the middle section 210 comprises a base 238 comprising a pair of transversely extending cross members 240, each being made of rectangular tubing. The base 238 of middle section 210 further comprises a pair of longitudinally extending end connecting members 242, each being made of rectangular tubing. As best shown in FIG. 16, the two connecting members 242 and two cross members 240 of base 238 of middle section 210 are welded together.

As shown in FIGS. 15A and 16, middle section 210 of the core 206 of the collapsible bedding foundation 10b further comprises an upper deck 246 comprising three transversely extending cross members 248, each being made of rectangular tubing. The upper deck 246 of middle section 210 further comprises a pair of longitudinally extending connecting members 250, each being made of rectangular tubing. As best shown in FIG. 16, the connecting members 250 and cross members 248 of upper deck 246 of middle section 210 are welded together. The upper deck 246 of middle section 210 further comprises a plurality of spaced, parallel longitudinally extending deck wires 236 extending between and secured to cross members 248 of upper deck 246 by welding.

Figure 24:
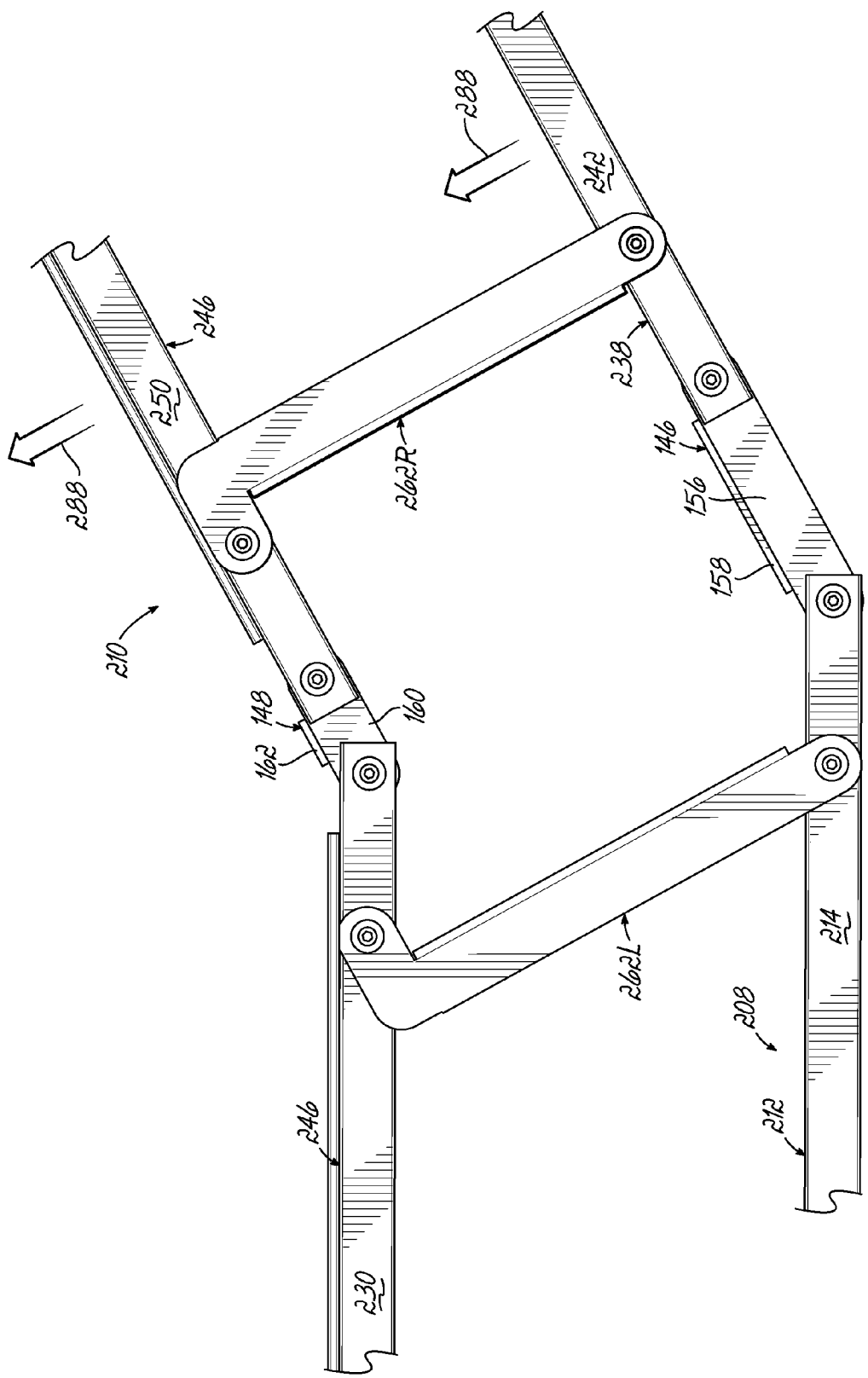
FIG. 24 is a side elevational view of a portion of the bedding foundation of FIG. 15A being collapsed.

As best seen in FIGS. 15A, 16 and 24, each of the end sections 208 and middle section 210 of the collapsible bedding foundation 10b each have at least one locking L-shaped spacer 260R, 260L, shown in detail in FIGS. 17A, 17B, 18A and 18B, and at least one regular L-shaped spacer 262R, 262L, shown in detail in FIGS. 19A, 19B, 20A and 20B. Each L-shaped spacer of each end section 208 is pivotally connected to the base 212 and the upper deck 224. As best seen in FIG. 15A, two columns of spacers space the upper deck 224 above the base 212 of each end section 208, the locking spacers locking the foundation in a stationary position when the foundation 10b is in its erected position and the locking members are secured in place.

FIGS. 17A and 17B illustrate a right-hand locking spacer 260R. Each right-hand locking spacer 260R is made of one piece of metal and comprises a generally planar body portion 254 having an opening 256 in the form of a hole at one end thereof and an opening 258 in the form of a hole at the other end thereof. The right-hand locking spacer 260R further comprises a leg 261 at one end thereof integral with the body portion 254, the leg 261 being co-planar with the body portion 254. The leg 261 has a second opening 264 at the end thereof in the form of a hole therein. The right-hand locking spacer 260R further comprises a flange 266 integral with the body portion 254. The flange 266 has first edge 268 and a second edge 270 proximate leg 261. As shown in FIGS. 17A and 17B, leg 261 extends generally perpendicular to the body portion 254, but in the same plane. Flange 266 extends generally perpendicular to the plane of the body portion 254 and leg 261. The right-hand locking spacer 260R further comprises a tapered edge 272 which functions to facilitate compression of spring clips 132RH, 132LH, as shown in FIGS. 23A-23E.

FIGS. 18A and 18B illustrate a left-hand locking spacer 260L. Each left-hand locking spacer 260L is made of one piece of metal and comprises a generally planar body portion 255 having an opening 257 in the form of a hole at one end thereof and an opening 259 in the form of a hole at the other end thereof. The left-hand locking spacer 260L further comprises a leg 263 at one end thereof integral with the body portion 255, the leg 263 being co-planar with the body portion 255. The leg 263 has a second opening 265 at the end thereof in the form of a hole therein. The left-hand locking spacer 260L further comprises a flange 267 integral with the body portion 255. The flange 267 has a first edge 269 and a second edge 271 proximate leg 263. As shown in FIGS. 18A and 18B, leg 263 extends generally perpendicular to the body portion 255, but in the same plane. Flange 267 extends generally perpendicular to the plane of the body portion 255 and leg 263. The left-hand locking spacer 260L further comprises a tapered edge 274 which functions to facilitate compression of spring clips 132RH, 132LH as shown in FIGS. 23A-23E.

FIGS. 19A and 19B illustrate a right-hand regular L-shaped spacer 262R, which is similar to right-hand locking spacer 260R shown in FIGS. 17A and 17B and described above. The right-hand regular L-shaped spacer 262R differs from right-hand locking spacer 260R in that it lacks an opening 258 and lacks a tapered edge 272. For simplicity, identical parts/portions of right-hand regular L-shaped spacer 262R are numbered the same as the part/portions of right-hand locking L-shaped spacer 260R, but with a prime after the number.

FIGS. 20A and 20B illustrate a left-hand regular L-shaped spacer 262L, which is similar to left-hand locking spacer 260L shown in FIGS. 18A and 18B and described above. The left-hand regular L-shaped spacer 262L differs from left-hand locking spacer 260L in that it lacks an opening 259 and lacks a tapered edge 274. For simplicity, identical parts/portions of left-hand regular L-shaped spacer 262L are numbered the same as the part/portions of left-hand locking L-shaped spacer 260L, but with a prime after the number.

Figure 23A:
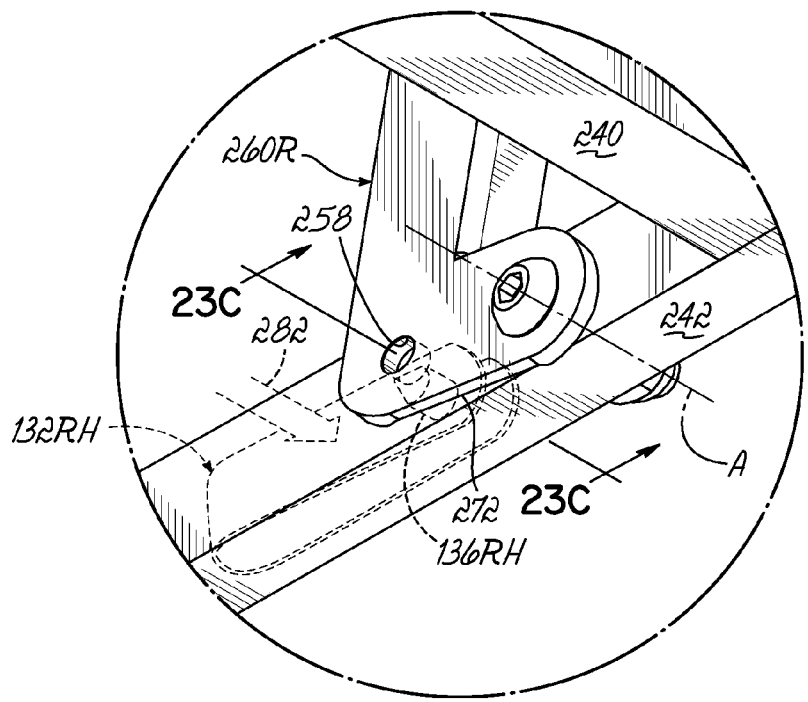
FIG. 23A is a front perspective view of the right-hand spring clip of FIG. 21 securing the right-hand spacer of FIGS. 18A and 18B in a locked position.

FIG. 15A illustrates the location of all four L-shaped spacers 260L, 260R, 262L and 262R in the bedding foundation 10b. Each of the sections 208, 210 has two L-shaped locking spacers, one left-hand L-shaped locking spacer 260L and one right-hand L-shaped locking spacer 260R. Additionally, each section 208, 210 has two L-shaped regular spacers, one left-hand L-shaped regular spacer 262L and one right-hand L-shaped regular spacer 262R. As shown in FIG. 15A, the leg of each L-shaped regular spacer is located on the outside of the core members while the leg of each L-shaped locking spacer is located on the inside of the core members so that once erected, the foundation may not easily collapse. As shown in FIGS. 23A-23, once the push pins of the spring clips pass through the openings in the L-shaped locking spacers, they may be pushed back in to collapse the foundation.

Figure 21:
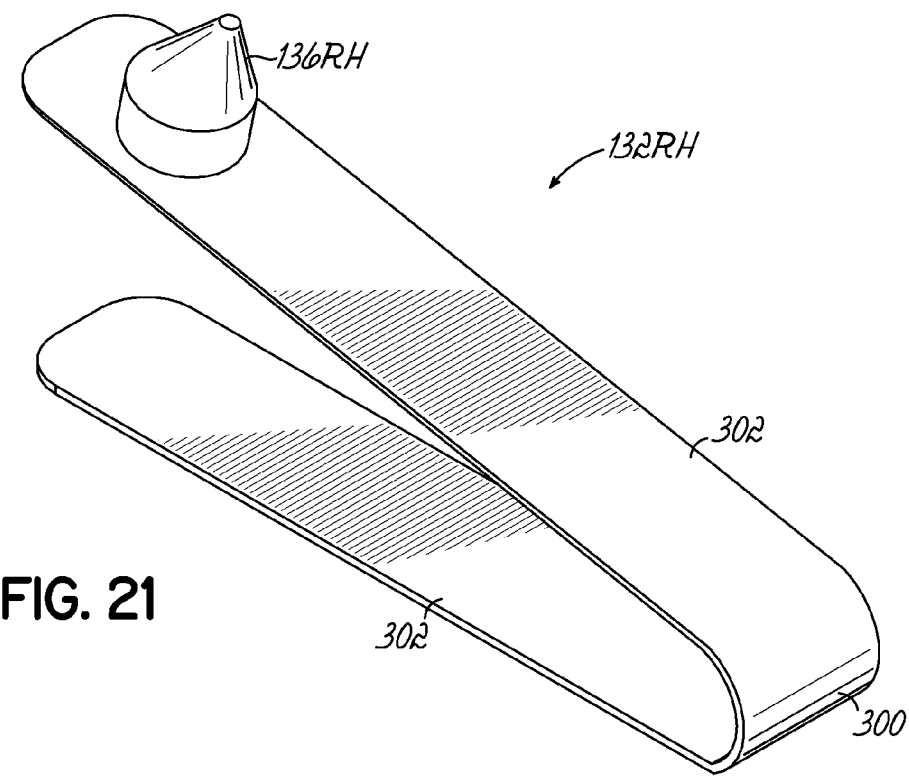
FIG. 21 is a front perspective view of one of the right-hand spring clips.
Figure 22:
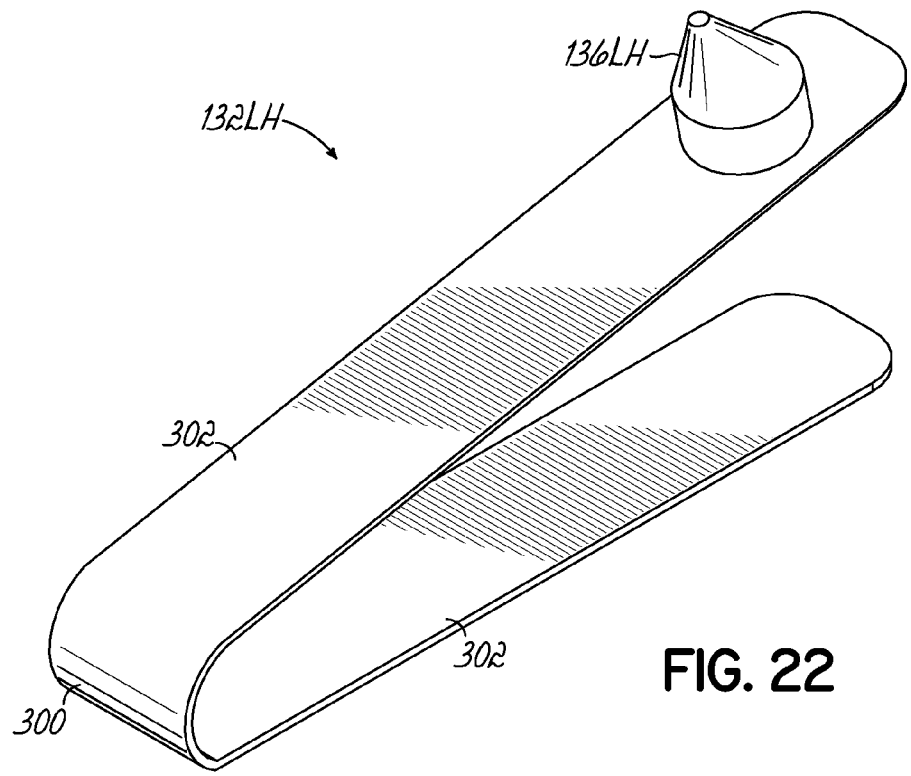
FIG. 22 is a front perspective view of one of the left-hand spring clips.

FIGS. 21 and 22 illustrate two slightly different locking members in the form of spring clips 132RH, 132LH to maintain the foundation 10b in an erected position or condition. For purposes of this document, spring clip 132RH has a push pin 136RH which is tapered in the right direction when viewed from a fold or bend 300 joining two legs 302, as seen in FIG. 21. Spring clip 132RH will be referred to as a right-hand spring clip. Spring clip 132LH has a push pin 136LH which is tapered in the left direction when viewed from a fold or bend 300 joining two legs 302, as shown in FIG. 22. Spring clip 132LH will be referred to as a left-hand spring clip.

Figure 25A:
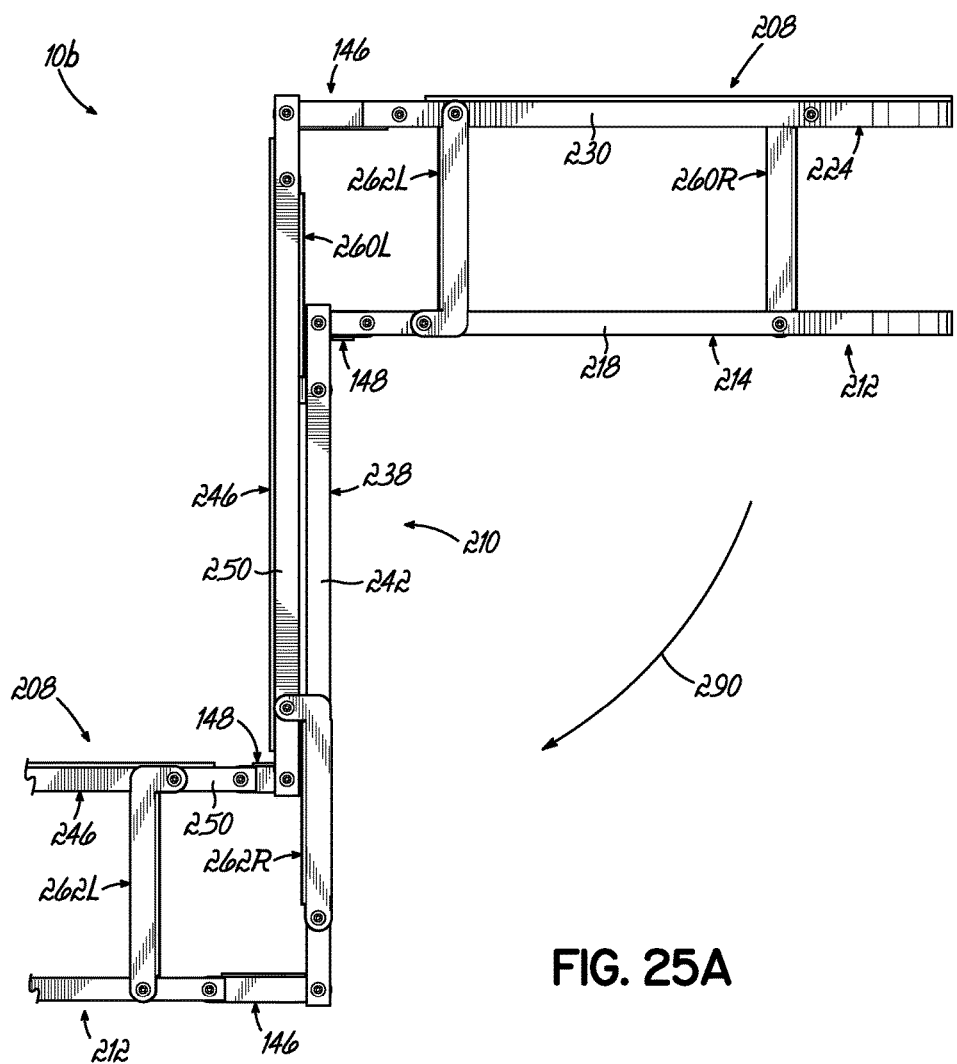
FIG. 25A is a side elevational view of a portion of the bedding foundation of FIG. 15A being partially collapsed.
Figure 25B:
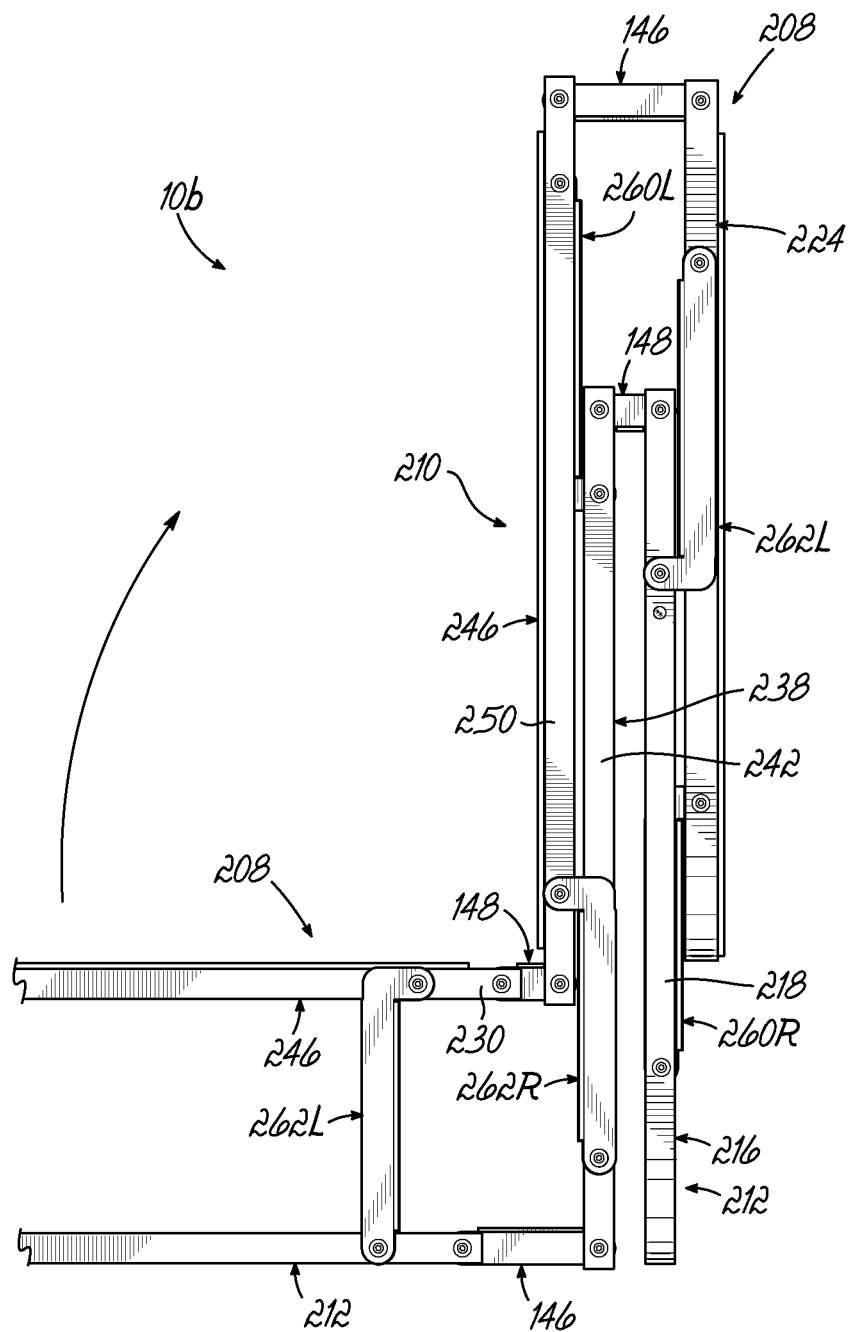
FIG. 25B is a side elevational view of a portion of the bedding foundation of FIG. 15A being partially collapsed.
Figure 25C:
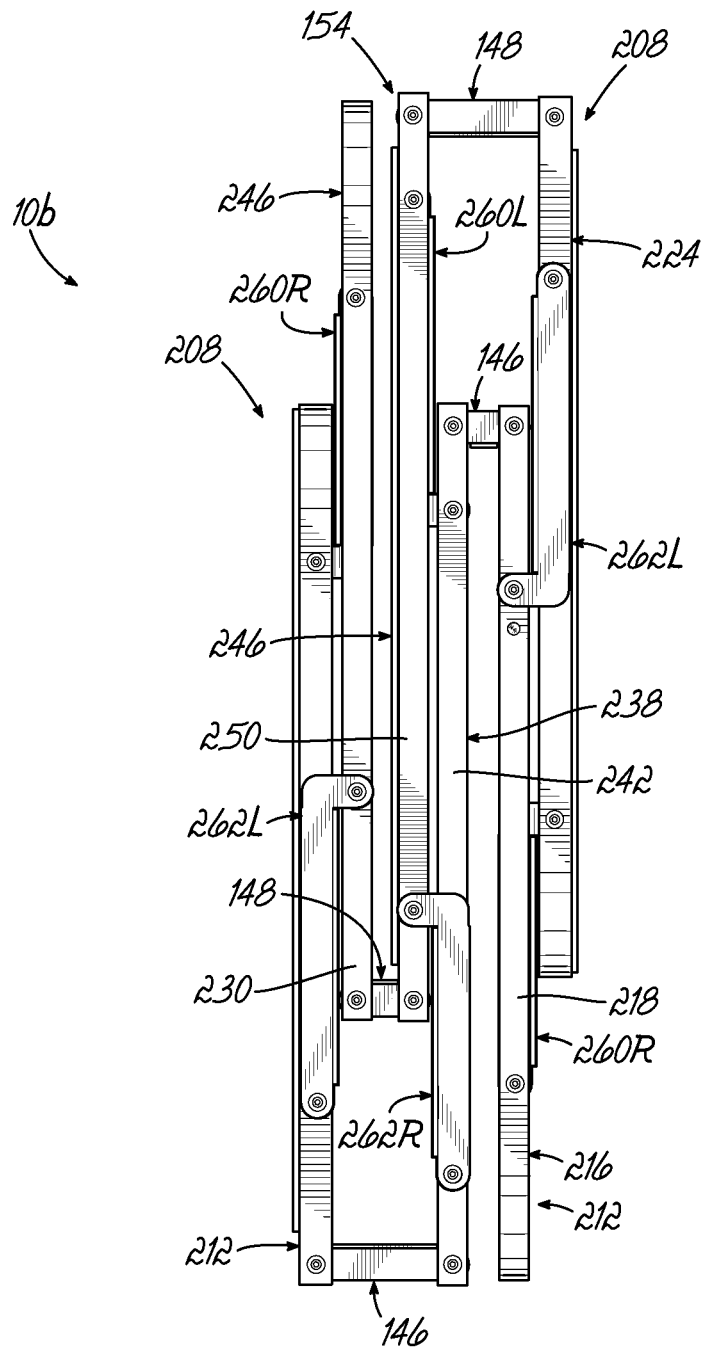
FIG. 25C is a side elevational view of a portion of the bedding foundation of FIG. 15A being fully collapsed.

The location of the spring clips 132RH, 132LH is shown by the six encircled areas shown in FIG. 15A (two per section). Right-hand spring clips 132RH (shown in FIG. 21) are located in the encircled areas labeled 301 RH in FIG. 15A. Left-hand spring clips 132LH (shown in FIG. 22) are located in the encircled areas labeled 301LH in FIG. 15A. As shown in FIGS. 23A-23E, each right-hand spring clip 132RH (shown in FIG. 22) has a push pin 136RH which is adapted to slide into and fit through opening 258 in a right-hand locking spacer 260R (shown in FIGS. 17A and 17B) due to its unique shape or taper. Similarly, each left-hand spring clip 132LH has a push pin 136LH which is adapted to slide into and fit through opening 259 in a left-hand locking spacer 260L (shown in FIGS. 18A and 18B) due to its shape or taper. As shown in FIGS. 25A-25C, the push pin 136RH, 136LH of each of the two locking members or spring clips 132RH, 132LH per section must be depressed in order to collapse the foundation.

As best shown in FIG. 15A, one spring clip 132RH and one spring clip 132LH are located inside the hollow interior of the sides 218 of the generally U-shaped perimeter member 214 of the base 212 of each end section 208. Thus, the end section 208 of foundation 10b (shown to the left in FIG. 15A) has only two spring clips, each one being in its base 212.

As best shown in FIG. 15A, the middle section 210 of foundation 20b also has two spring clips, each one being in the base 238 of the middle section 210. One spring clip 132RH is located inside the hollow interior of one of the longitudinally extending connecting members 242 of the base 238 of the middle section 210. Likewise, one spring clip 132LH is located inside the hollow interior of the other longitudinally extending connecting member 242 of the base 238 of the middle section 210.

Figure 23B:
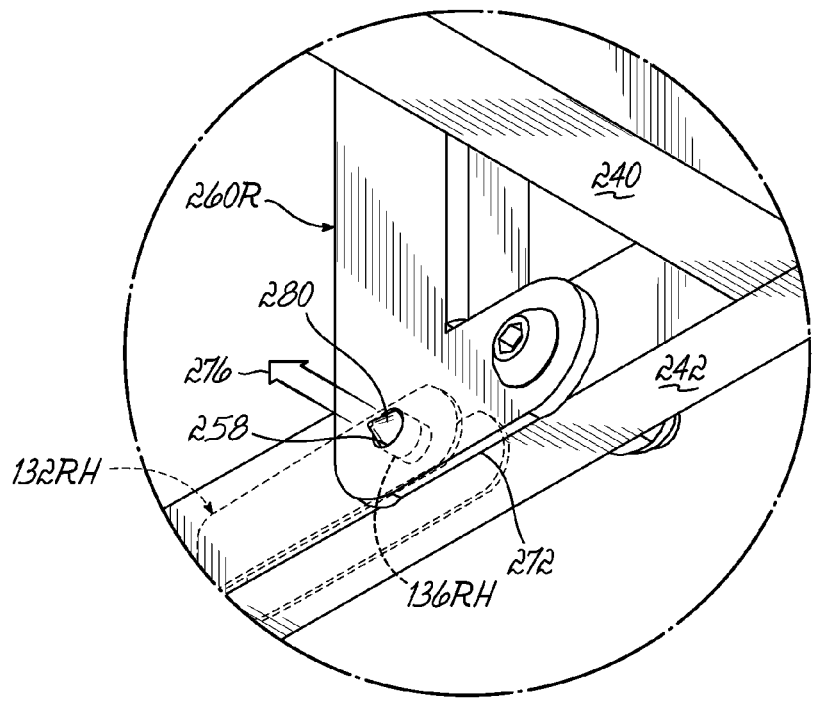
FIG. 23B is a front perspective view of the encircled area 23B of FIG. 15A.
Figure 23C:
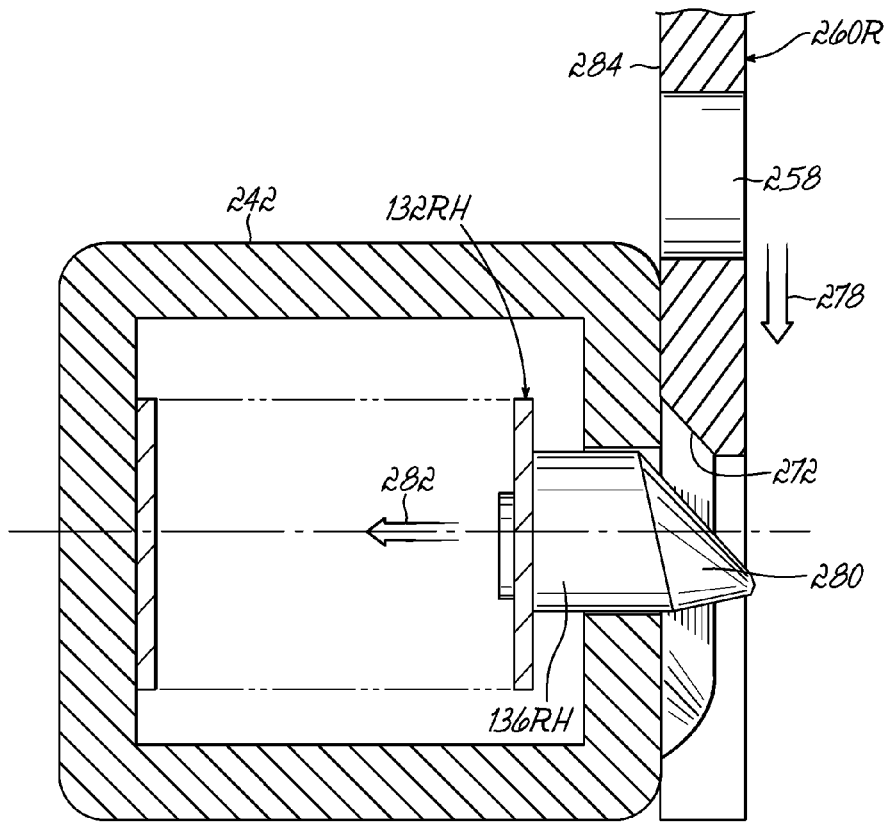
FIG. 23C is a cross-sectional view taken along the line 23C-23C of FIG. 23A.
Figure 23D:
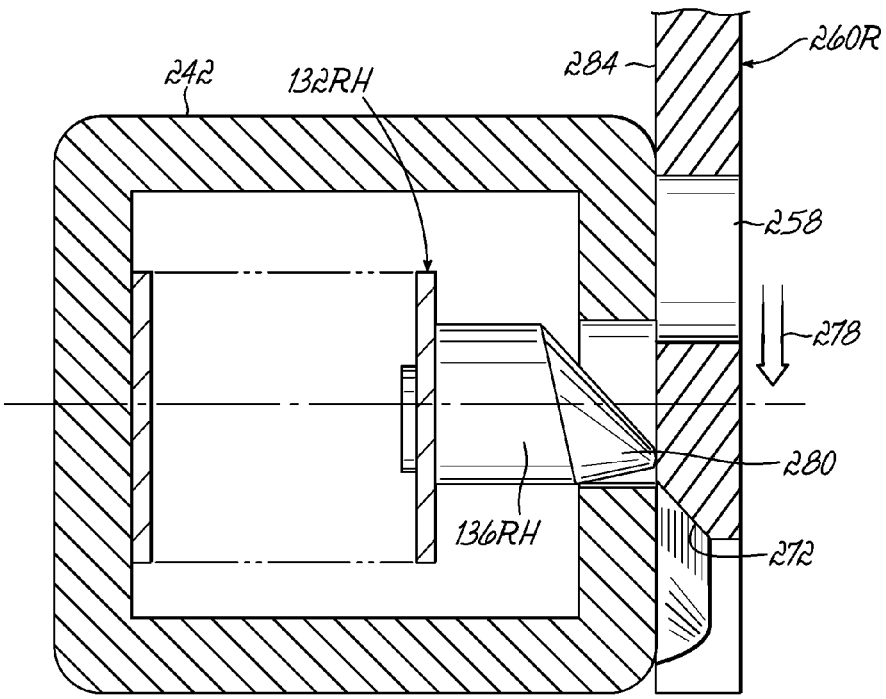
FIG. 23D is a cross-sectional view like FIG. 23C showing the right-hand spacer of FIG. 23B being raised.
Figure 23E:
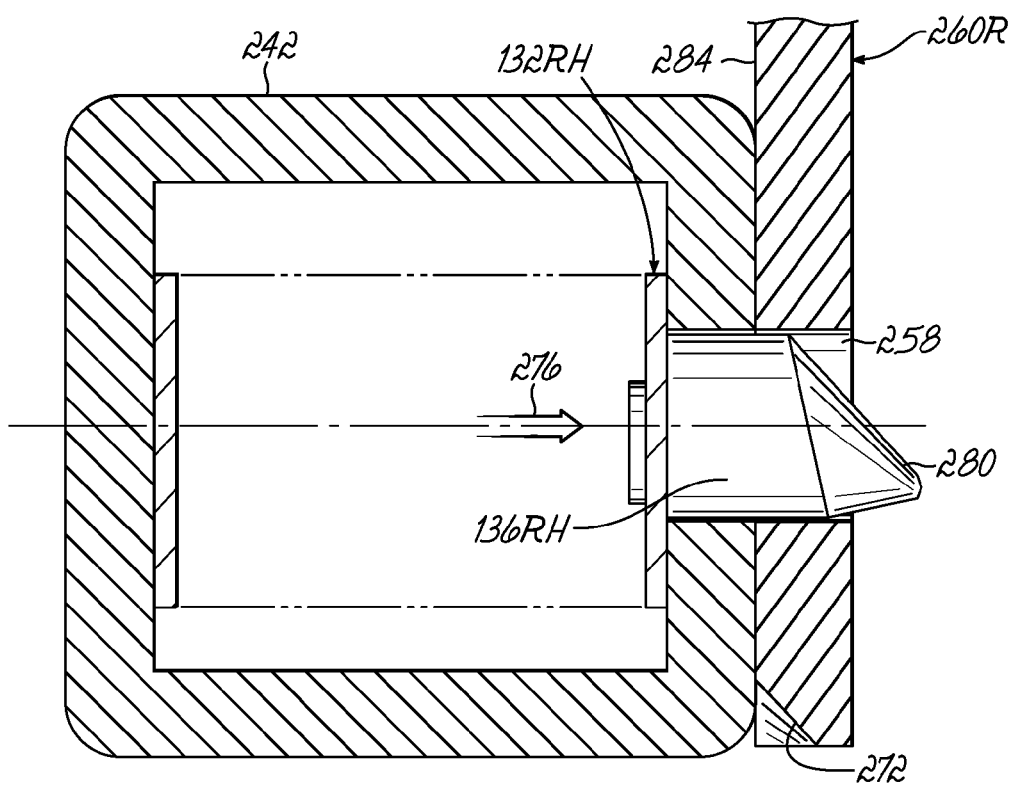
FIG. 23E is a cross-sectional view like FIG. 23D showing the right-hand spacer of FIG. 23B being locked.

As best shown in FIGS. 23A-23E, spring clip 132RH, located in the hollow interior of connecting member or side 242 of middle section 210 (shown to the right in FIG. 15A), is movable between a disengaged position shown in FIGS. 23A and 23C in which the foundation may be collapsed and an engaged and locked position shown in FIGS. 23B and 23E in which the foundation is maintained in its erected position. As the locking L-shaped spacer 260R pivots about axis A shown in FIG. 23A, the push pin 136RH of spring clip 132RH extends through an opening in the side 242 of the middle section 210 and then through opening 258 of right-hand locking spacer 260R in the direction of arrow 276 shown in FIG. 23B. This movement of the push pin 136RH of spring clip 132RH is caused by the inherent resiliency of the partially compressed spring clip 132RH. As shown in FIGS. 23C and 23D, as the right-hand locking spacer 260R is pivoted about axis A downwardly in the direction of arrow 278, the tapered edge 272 of the locking L-shaped spacer 260R contacts the skewed conical end 280 of the push pin 136RH of spring clip 132RH, further compressing the spring clip 132RH in the direction of arrow 282 of FIG. 23C. As shown in FIG. 23D, the skewed conical end 280 of the push pin 136RH of spring clip 132RH slides along an inside surface 284 of the right-hand locking spacer 260R until push pin 136RH of spring clip 132RH passes through opening 258 of right-hand locking spacer 260R in the direction of arrow 276 shown in FIG. 23E.

Figure 26:
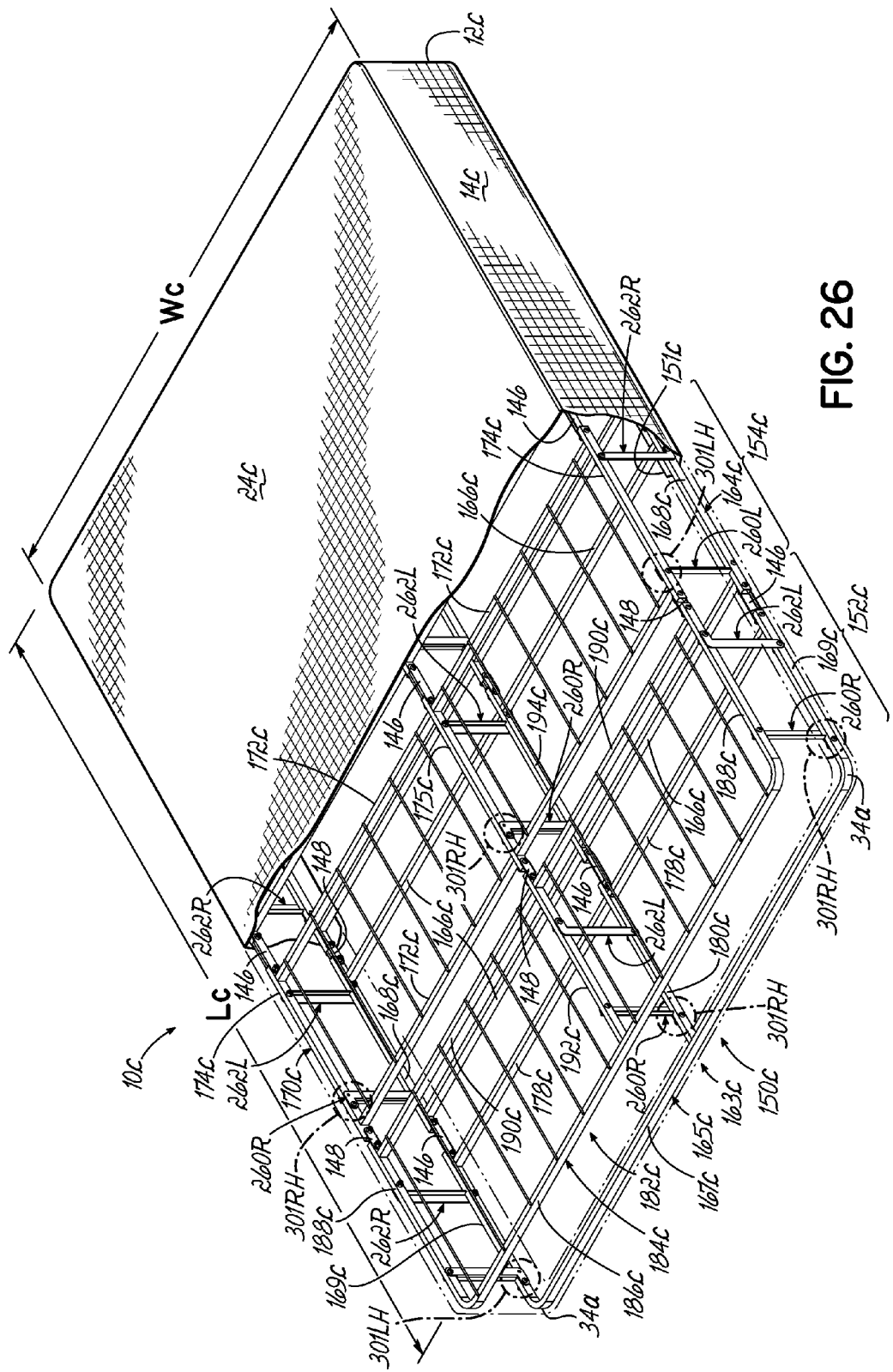
FIG. 26 is a perspective view of another embodiment of collapsible bedding foundation in an erected condition with a removable cover.

FIG. 24 illustrates the middle section 210 being moved upwardly in the direction of arrows 288 to raise the middle section 210 relative to the end section 208 and partially collapse the foundation 10b. FIG. 25 illustrates the middle section 210 being fully collapsed. FIG. 26 illustrates the end sections 208 being fully collapsed.

FIGS. 24-26 illustrate the method of collapsing the foundation 10b. FIG. 24 illustrates the middle section 210 being moved from a horizontal position to a vertical position by raising the middle section 210 in the direction of arrows 288 shown in FIG. 24 after all the push pins of all the spring clips have been depressed. FIG. 25A illustrates the foundation 10b with the middle section 210 in a vertical position. FIG. 25A illustrates the rightmost end section 208 being moved in the clockwise direction shown by the arrow 290. FIG. 25B illustrates the rightmost end section 208 being collapsed and located adjacent the middle section 210. FIG. 25C illustrates the foundation in its fully collapsed position for storage or shipment, the leftmost end section 208 being collapsed and located adjacent the middle section 210.

FIGS. 26-29D illustrate an alternative embodiment of collapsible bedding foundation 10c, which has four hinged sections. This four-section embodiment is like the embodiment shown in FIGS. 9-14D and described above. For the sake of simplicity, like parts have like numbers but with a "c" designation for the embodiment shown in FIGS. 26-29D. This embodiment uses right-hand and left-hand L-shaped locking spacers 260R and 260L, respectively, as shown in FIGS. 17A-20B and described above. This embodiment further uses spring clips 132RH as shown in FIG. 21 and spring clips 132LH as shown in FIG. 22.

The collapsible bedding foundation 10c has a pair of end surfaces 12c defining a length or longitudinal dimension Lc of the foundation 10c and a pair of opposed side surfaces 14c defining a width Wc of the foundation 10c.

Figure 26A:
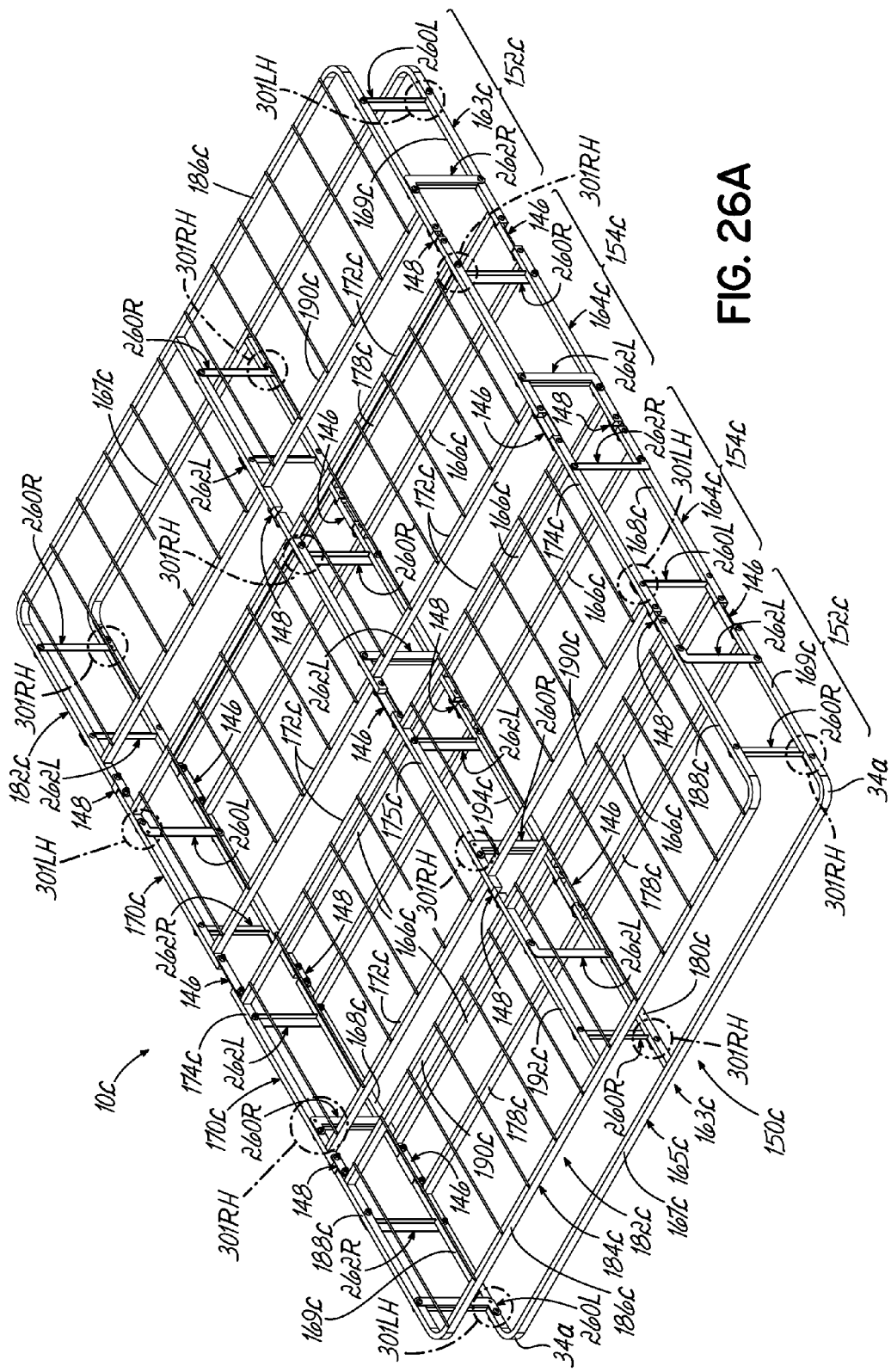
FIG. 26A is a perspective view of the collapsible bedding foundation of FIG. 26 without any covering.

The bedding foundation 10c comprises a core 150c shown in detail in FIG. 26A comprising two end sections 152c and two middle sections 154c hinged together. The hinges 146, 148 enable the bedding foundation 10c to move from an erected position shown in FIGS. 26 and 26A to a collapsed position shown in FIG. 29D. Although the drawings (except FIG. 26) illustrate this embodiment of bedding foundation 10c with no cover, the bedding foundation 10c may be collapsed with a removable cover 24c as partially shown in FIG. 26. If desired, padding (not shown) may be placed on an upper surface of the bedding product 10c before the cover 24c is attached. The cover 24c is illustrated having an elastic band 151 at the bottom thereof. However, any removable cover, including the zippered cover 24 illustrated in FIG. 1, may be used.

The core 150c of bedding foundation 10c has each end section 152c hinged to a middle section 154c with multiple long and short hinges 146, 148, respectively. Similarly, the two middle sections 154c are hinged together with multiple long and short hinges 146, 148, respectively, as described above.

Figure 27:
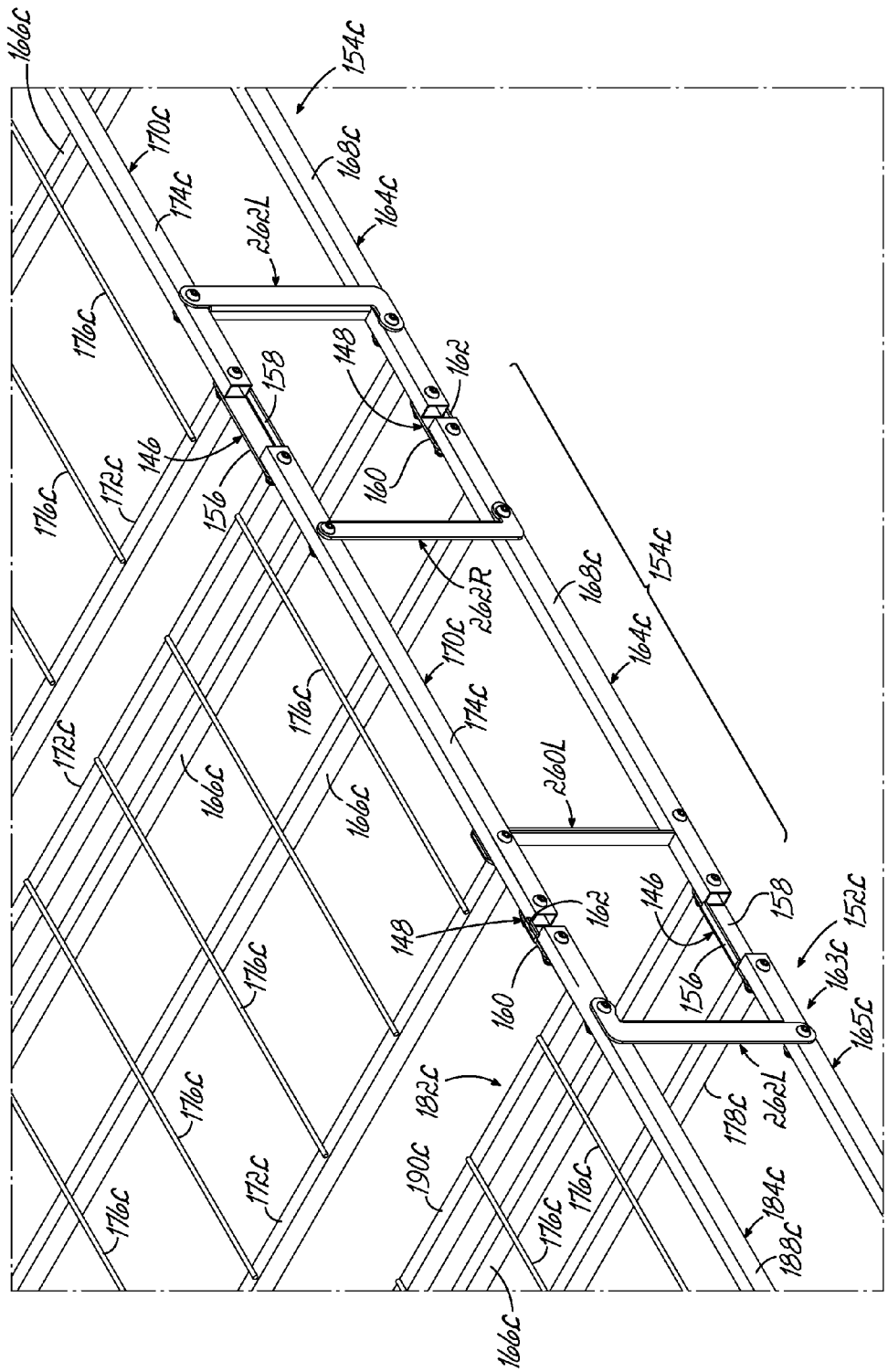
FIG. 27 is an enlarged perspective view of a portion of the collapsible bedding foundation of FIG. 27A.

As best shown in FIGS. 26A and 27, each end section 152c is hingedly secured to its adjacent middle section 154c with three lower long hinges 146 and three upper short hinges 148. When the foundation 10c is fully erect, as shown in FIG. 26A, each short hinge 148 is above one of the long hinges 146 at the juncture of an end section 152c and a middle section 154c. As best shown in FIG. 27, the two middle sections 154c are hingedly secured together with three lower short hinges 148 and three upper long hinges 146. When the foundation 10c is fully erect, as shown in FIG. 26A, each short hinge 148 is below one of the long hinges 146 at the juncture of the middle sections 154c.

Referring to FIG. 26A, each end section 152c comprises a base 163c comprising a generally U-shaped member 165c made of rectangular tubing as defined hereinabove. The hollow generally U-shaped member 165c comprises an end member 167c and a pair of opposed parallel sides 169c joined together with corner members 34a. Although the generally U-shaped member 165c is shown comprising multiple members joined together, the generally U-shaped member 165c may be made of a single piece of rectangular tubing. The base 163c further comprises two transversely extending cross members 178c, each being made of rectangular tubing. Each cross member 178c extends between, and is secured to, one of the sides 169c of the generally U-shaped base member 165c and a longitudinally extending middle member 180c. The middle member 180c is secured to and extends between the hinge 148 and the end member 167c of the generally U-shaped base 163c. The base middle member 180c is made of rectangular tubing.

As shown in FIGS. 26 and 26A, each end section 152c of the core 150c of the collapsible bedding foundation 10c further comprises an upper deck 182c comprising a generally U-shaped deck member 184c made of rectangular tubing. The generally U-shaped deck member 184 has one end 186c and two sides 188c. Although the generally U-shaped deck member 184c is shown comprising multiple members joined together, the generally rectangular U-shaped deck member 184c may be made of a single piece of rectangular tubing. The upper deck 182c further comprises two transversely extending cross members 190c, each being made of rectangular tubing. Each cross member 190c extends between, and is secured to, one of the sides 188c of the generally U-shaped deck member 184c.

The upper deck 182c further comprises a longitudinally extending middle member 192c secured to and extending between the end 186c of the generally U-shaped deck member 184c and the transversely extending cross member 190c. The middle member 192c is made of rectangular tubing. As best shown in FIG. 27, the upper deck 182c further comprises a plurality of spaced, parallel longitudinally extending deck wires 176c secured to end 186c of the generally U-shaped deck member 184c and cross member 190c of upper deck 182c by welding.

Referring to FIG. 26A, each middle section 154c comprises a base 164c having two transversely extending cross members 166c, each being made of rectangular tubing. The base 164c of each middle section 154c further comprises a pair of longitudinally extending end connecting members 168c and a middle connecting member 194c, each being made of rectangular tubing. As best shown in FIG. 27, the three connecting members 168c, 194c and cross members 166c of each base 164c of each middle section 154c are welded together.

As shown in FIGS. 26A and 27, each middle section 154c of the core 150c of the collapsible bedding foundation 10c further comprises an upper deck 170c, a pair of transversely extending cross members 172c, each being made of rectangular tubing. The upper deck 170c of each middle section 154c further comprises a pair of longitudinally extending end connecting members 174c and a middle connecting member 175c, each being made of rectangular tubing. As best shown in FIG. 27, the connecting members 174c, 175c and cross members 172c of each upper deck 170c of each middle section 154c are welded together. The upper deck 170c of each middle section 154c further comprises a plurality of spaced, parallel longitudinally extending deck wires 176c extending between and secured to cross members 172c of upper deck 170c by welding.

Figure 29A:
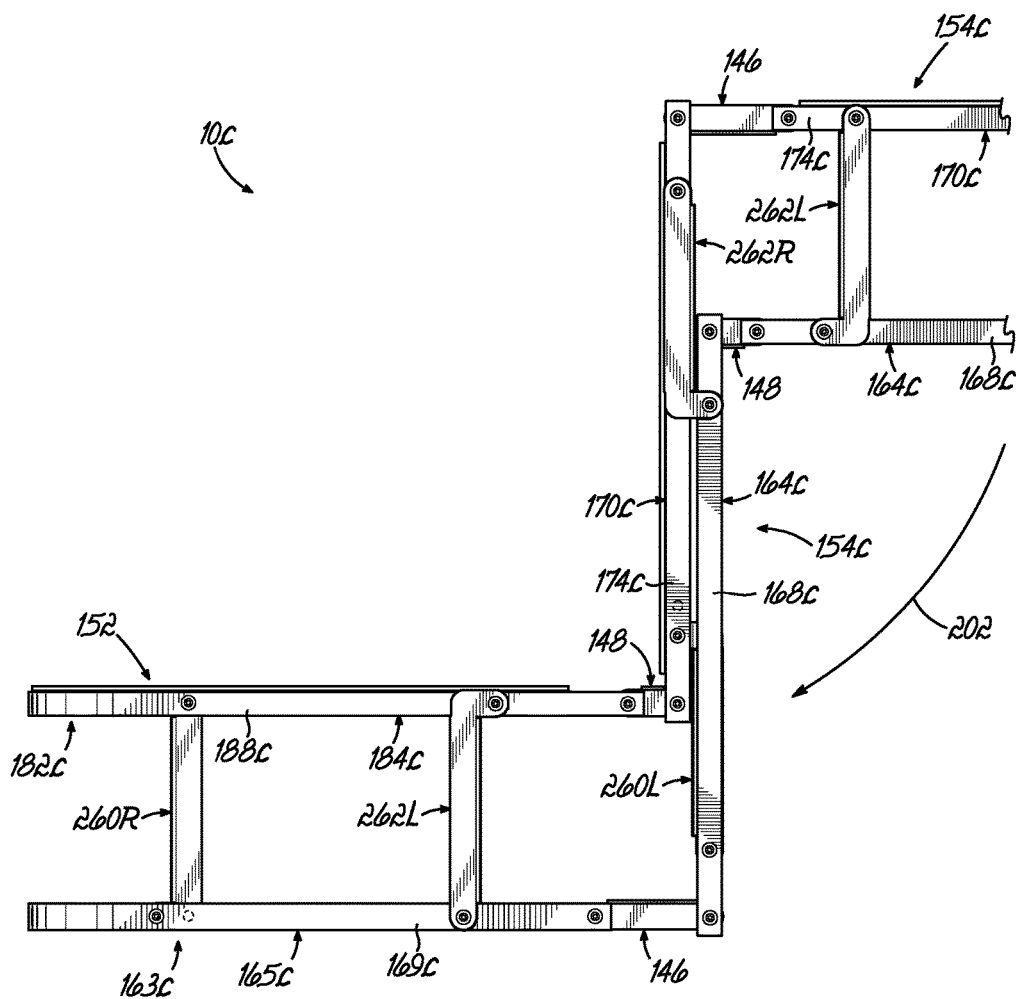
FIG. 29A is a side elevational view of a portion of the bedding foundation of FIG. 27A being partially collapsed.

As best seen in FIGS. 26A, 27 and 29A, each of the sections 152c, 154c of the collapsible bedding foundation 10c further comprises multiple L-shaped locking spacers 260R and 260L and multiple L-shaped regular spacers 262R and 262L. The location of each of the L-shaped spacers is best shown in detail in FIG. 26A. Each L-shaped spacer of each end section 152c is pivotally connected to the base 163c and the upper deck 182c. As best seen in FIG. 26A, three columns of L-shaped spacers space the upper deck 182c above the base 163c and lock the foundation in a stationary position when the foundation is in its erected position and the locking members are secured in place.

In each end section 152c, each spacer within a column of spacers (each column having one L-shaped locking spacer 260R, 260L and one L-shaped regular spacer 262R, 262L) is pivotally connected to the far side 169c of the generally U-shaped base member 163c and the far side 188c of the generally U-shaped deck member 184c of the upper deck 182c. Additionally, each spacer of another column of spacers is pivotally connected to the near side 169c of the generally U-shaped base member 163c and the near side 188c of the generally U-shaped deck member 184c of the upper deck 116c. Lastly, each spacer of a third or middle column of spacers is pivotally connected to the middle member 180c of the base 163c and the middle member 192c of the upper deck 182c.

Similarly, in each middle section 154c, a spacer within a column of spacers is pivotally connected to each end connecting member 168c of the base 164c and each end connecting member 174c of the upper deck 170c. Additionally, each spacer within a third or middle column of spacers is pivotally connected to the middle connecting member 194c of the base 164c and the middle connecting member 175c of the upper deck 170c.

The location of the spring clips 132RH, 132LH is shown by the twelve encircled areas shown in FIG. 26A (three per section). Right-hand spring clips 132RH (shown in FIG. 21) are located in the encircled areas labeled 301 RH in FIG. 26A. Left-hand spring clips 132LH (shown in FIG. 22) are located in the encircled areas labeled 301LH in FIG. 26A. As shown in the drawings, the push pin 136RH, 136LH of each of the three locking members or spring clips 132RH, 132LH per section must be depressed in order to collapse the foundation 10c.

Figure 29B:
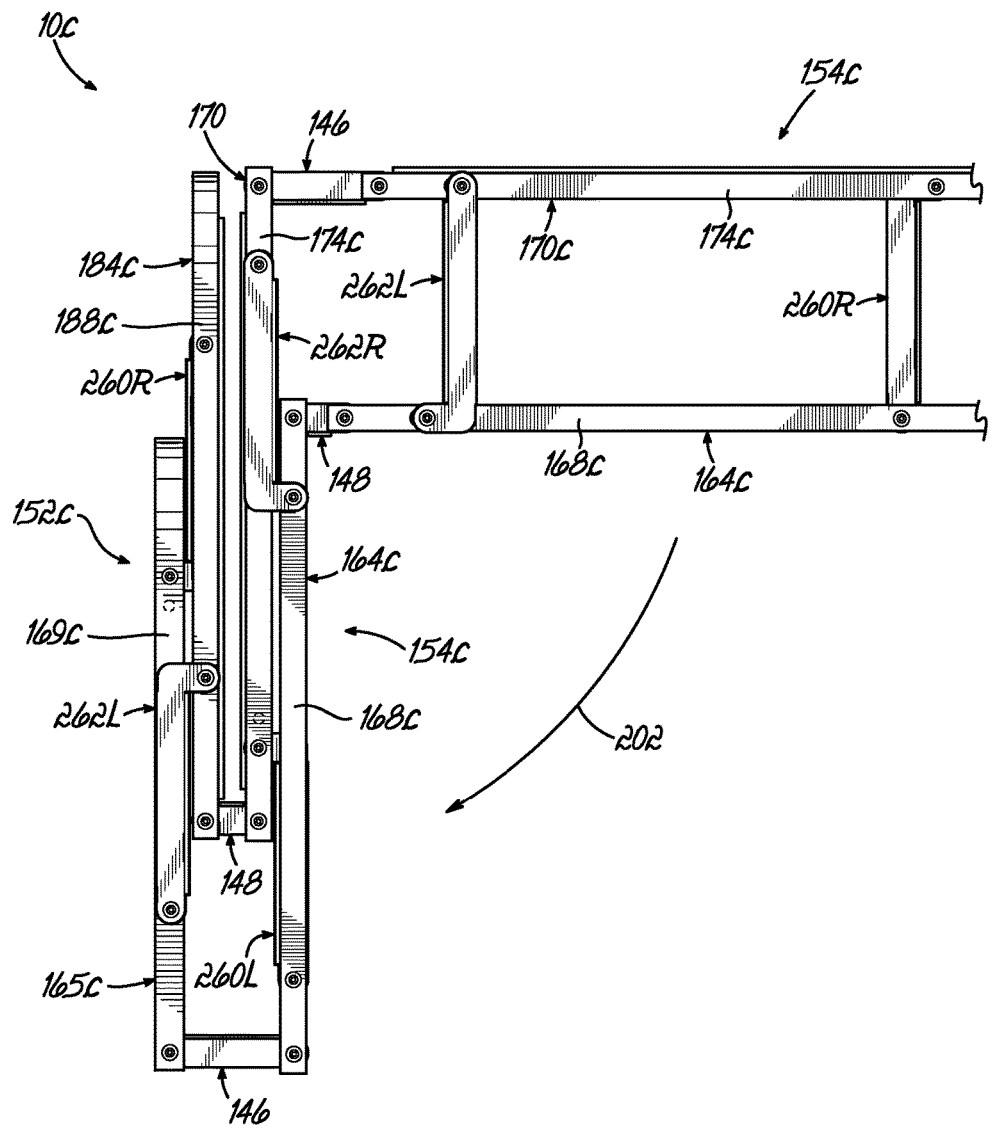
FIG. 29B is a side elevational view of a portion of the bedding foundation of FIG. 27A being partially collapsed.
Figure 29C:
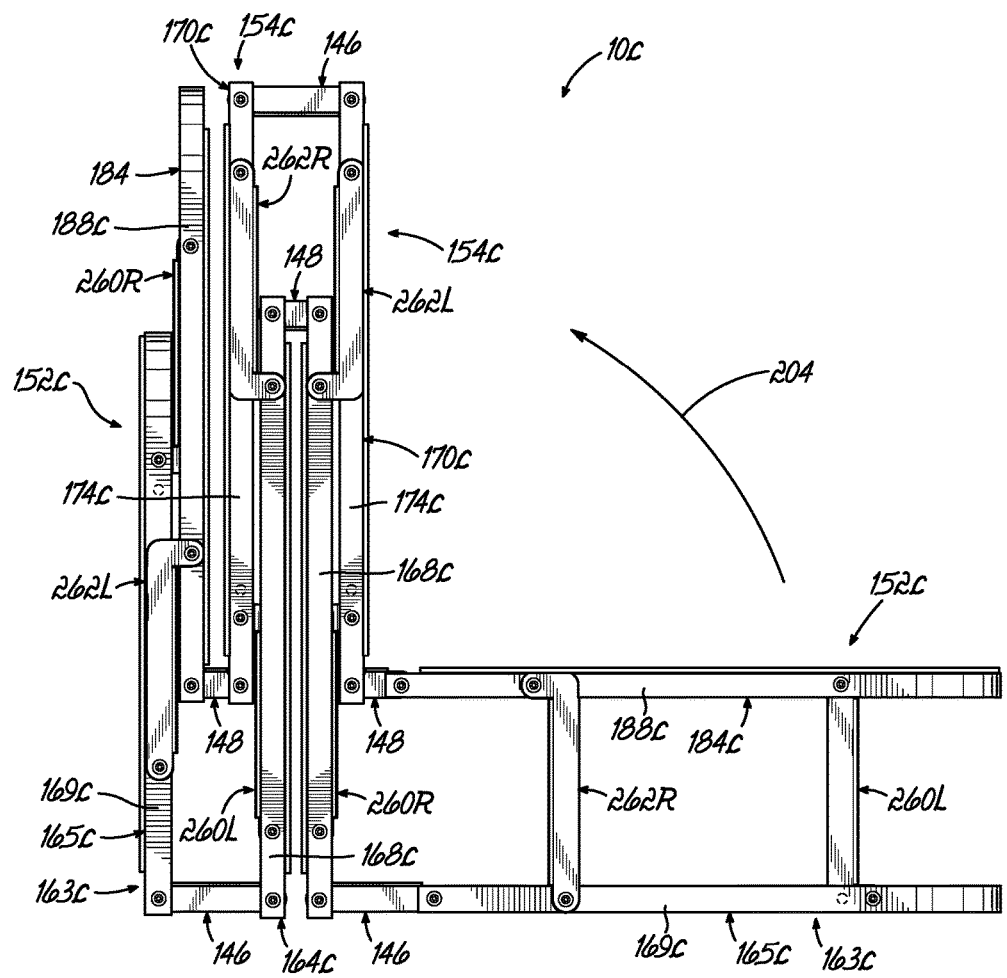
FIG. 29C is a side elevational view of a portion of the bedding foundation of FIG. 27A being partially collapsed.
Figure 29D:
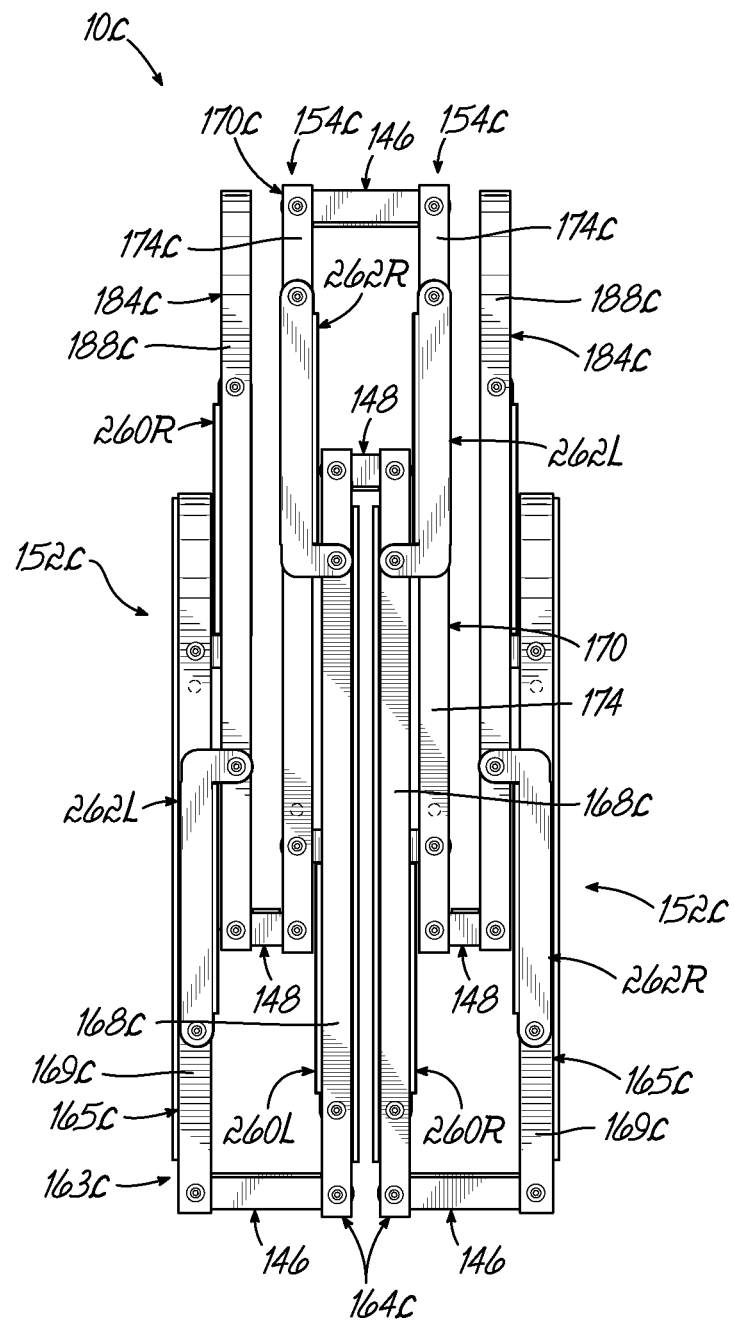
FIG. 29D is a side elevational view of the bedding foundation of FIG. 27A being fully collapsed.

FIGS. 28 and 29A-29D illustrate the method of collapsing the foundation 10c. FIG. 28 illustrates one of the middle sections 154c being moved from a horizontal position to a vertical position by raising the middle section 154c in the direction of arrows 200 shown in FIG. 28 after three locking members 140 in the form of spring clips 132RH, 132LH have been depressed (only one being shown in FIG. 28). FIG. 29A illustrates the foundation 10c with the middle section 154c in a vertical position. FIG. 29A illustrates the leftmost end section 152c being moved in the counterclockwise direction shown by the arrow 202. FIG. 29B illustrates the leftmost end section 152c being collapsed and located adjacent the leftmost middle section 154c. FIG. 29C illustrates the rightmost end section 152c being moved in the clockwise direction shown by the arrow 204. FIG. 29D illustrates the foundation in its fully collapsed position for storage or shipment, the rightmost end section 152c being collapsed and located adjacent the rightmost middle section 154c.

The embodiments of the invention shown and described are for illustrative purposes only. The drawings and the description shall not limit in any way the scope of the invention as defined in the claims. While those skilled in the art may make various changes to, or additional embodiments of, the invention, none of those changes/embodiments shall be deemed to depart from the spirit of the invention. Thus, all such changes/embodiments shall be embraced by the scope of the invention as defined in the claims. Accordingly, the invention is to be limited only by the scope of the following claims and their equivalents.

The invention claimed is:

1. A foldable bedding foundation comprising:
   a first section having a first base, a first deck and a plurality of generally L-shaped spacers pivotally secured to said first base and first deck of said first section;

a second section having a second base, a second deck and a plurality of generally L-shaped spacers pivotally secured to said second base and second deck of said second section;

a third section having a third base, a third deck and a plurality of generally L-shaped spacers pivotally secured to said third base and third deck of said third section;

locking members extending through openings in at least some of the generally L-shaped spacers for locking said decks spaced from said bases of said respective sections;

upper hinges secured to and extending between adjacent decks; and lower hinges secured to and extending between adjacent bases, wherein each of the spacers has a flange sized to abut one of the bases and a perimeter member of one of the upper decks when the foundation is erected.

2. The foldable bedding foundation of claim 1 wherein the base of each of said sections has a hollow U-shaped outer member and a hollow middle member.

3. The foldable bedding foundation of claim 1 wherein locking members comprise spring clips.

4. The foldable bedding foundation of claim 1 wherein the base of the first and third sections comprises a hollow generally U-shaped member and at least one cross member, each cross member extending between sides of the generally U-shaped member.

5. The foldable bedding foundation of claim 4 wherein each cross member of the base of the first and third sections is made of rectangular tubing.

6. The foldable bedding foundation of claim 1 wherein the upper deck of each of the sections has multiple longitudinally extending wires.

7. The foldable bedding foundation of claim 1 wherein the perimeter member of at least one of the decks is made of rectangular tubing.

8. The foldable bedding foundation of claim 1 wherein each of the sections has multiple spacers on each side of the section.

9. A foldable bedding foundation comprising:
two end sections, each end section having a base, an upper deck and a plurality of generally L-shaped spacers pivotally secured to the base and upper deck of the end section;

a middle section having a middle base, a middle upper deck and a plurality of generally L-shaped spacers pivotally secured to the middle base and the middle upper deck of the middle section;

locking members extending through openings in at least some of the generally L-shaped spacers for locking the upper decks spaced from the bases of the end and middle sections, respectively; and each end section being hinged to the middle section with multiple short hinges and multiple long hinges.

10. The foundation of claim 9 wherein the base of each of the end sections comprises a hollow generally U-shaped member and at least one cross member, each cross member extending between the sides of the generally U-shaped member and being made of rectangular tubing.

11. The foundation of claim 9 wherein each end section is hinged to the middle section with a short hinge and a long hinge secured to and extending between the upper decks of the sections and another short hinge and another long hinge secured to and extending between the bases of the sections.

12. The foundation of claim 9 wherein the middle section is hinged to each other with a short hinge and a long hinge secured to and extending between the upper decks of the middle sections and another short hinge and another long hinge secured to and extending between the bases of the sections.

13. The foundation of claim 9 wherein the spacers comprise left-hand spacers and right-hand spacers.

14. The foldable bedding foundation of claim 9 wherein the locking members are spring clips.

15. The foldable bedding foundation of claim 14 wherein said bedding foundation may be collapsed by compressing the spring clips.

16. The foldable bedding foundation of claim 9 wherein said foundation has multiple columns of spacers.

17. A foldable bedding foundation comprising:
a first section having a first base, including a first generally U-shaped base member and a middle base member, a first upper deck including a first perimeter deck member and a middle member extending between ends of the first perimeter deck member, and right-hand and left-hand generally L-shaped spacers pivotally secured to the first base and the first upper deck;

a second section having a second base, including a second generally U-shaped base member and a middle base member, a second upper deck including a second perimeter deck member and a middle member extending between ends of the second perimeter deck member, and right-hand and left-hand generally L-shaped spacers pivotally secured to the second base and the second upper deck;

locking members extending through openings in at least some of the generally L-shaped spacers for locking said L-shaped spacers in a fixed position and the first and second upper decks spaced from said first and second bases of said first and second sections, respectively;

at least one upper hinge secured to and extending between the first and second upper decks;

at least one lower hinge assembly extending between the first and second bases; and an upholstered covering wherein each of the spacers has a flange sized to abut one of the bases and a perimeter member of one of the upper decks when the foundation is erected.

18. The foldable bedding foundation of claim 17 wherein each of the bases is made at least partially of metal tubing.

19. The foldable bedding foundation of claim 17 wherein each of the base members is hollow.

20. The foldable bedding foundation of claim 17 wherein the foundation has multiple upper hinges and multiple lower hinges.

* * * * *

UNITED STATES PATENT AND TRADEMARK OFFICE
CERTIFICATE OF CORRECTION

PATENT NO. : 10,034,551 B2
APPLICATION NO. : 15/009247
DATED : July 31, 2018
INVENTOR(S) : John E. Hull Page 1 of 1

It is certified that error appears in the above-identified patent and that said Letters Patent is hereby corrected as shown below:

In the Specification

Column 1
Line 30, delete the first occurrence of "coil".

Column 3
Line 16, "FIG. 10" should be ---FIG. 1C---.

Column 13
Line 28, "each have" should be ---each has---.

In the Claims

Column 20
Lines 8-9, Claim 12 "section is" should be ---sections are---.

Signed and Sealed this
Twenty-fifth Day of September, 2018

Andrei Iancu
*Director of the United States Patent and Trademark Office*